US011126691B1

(12) United States Patent
Andrew

(10) Patent No.: US 11,126,691 B1
(45) Date of Patent: Sep. 21, 2021

(54) APPARATUS AND METHOD FOR GENERATING A VECTOR OF ELEMENTS WITH A WRAPPING CONSTRAINT

(71) Applicant: Arm Limited, Cambridge (GB)

(72) Inventor: Jack William Derek Andrew, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/909,147

(22) Filed: Jun. 23, 2020

(51) Int. Cl.
*G06F 17/16* (2006.01)
*G06F 9/30* (2018.01)

(52) U.S. Cl.
CPC ............ *G06F 17/16* (2013.01); *G06F 9/3001* (2013.01); *G06F 9/30036* (2013.01); *G06F 9/30043* (2013.01)

(58) Field of Classification Search
None
See application file for complete search history.

(56) References Cited

U.S. PATENT DOCUMENTS 8,527,742 B2 * 9/2013 Gonion ................. G06F 9/3838
712/222
9,335,997 B2 * 5/2016 Gonion ............... G06F 9/30032
(Continued)

OTHER PUBLICATIONS

Yang-Guang, L. etal., Extract Candidates of Support Vector Traning Set, 2003, IEEE, pp. 3199-3202. (Year: 2003).*
(Continued)

*Primary Examiner* — Eric Coleman
(74) *Attorney, Agent, or Firm* — Nixon & Vanderhye P.C.

(57) ABSTRACT

An apparatus is provided that receives a scalar start value, an adjust amount and wrapping control information, and includes vector generating circuitry for generating a vector comprising a plurality of elements such that a value of a first element is dependent on the scalar start value, and values of the plurality of elements follow a regularly progressing sequence that is constrained to wrap as required to ensure that each value is within bounds determined from the wrapping control information. The adjust amount is used to determine a difference between values of adjacent elements in the regularly progressing sequence. The vector generating circuitry has first adder circuitry for generating a plurality of first candidate values for the plurality of elements, assuming absence of a wrapping condition, and second adder circuitry for generating a plurality of second candidate values for the plurality of elements, assume presence of a wrapping condition. Wrap detection circuitry determines an adjustment limit value that provides an indication of a total number of regularly progressing values differing by the adjust amount that are available within the bounds determined from the wrapping control information, and a current adjustment value that, taking into account the scalar start value, provides an indication of an initial number of regularly progressing values differing by the adjust amount that are available before the wrapping condition occurs. Result selection circuitry selects, for each element in the plurality of elements, one of the first candidate values and the second candidate values, in dependence on at least the adjustment limit value and the current adjustment value.

22 Claims, 30 Drawing Sheets

(56) References Cited

U.S. PATENT DOCUMENTS

| | | | |
|---|---|---|---|
| 2013/0024669 A1* | 1/2013 | Gonion | G06F 9/30032 |
| | | | 712/222 |
| 2013/0024672 A1* | 1/2013 | Gonion | G06F 9/30072 |
| | | | 712/222 |
| 2019/0369995 A1 | 12/2019 | Botman et al. | |

OTHER PUBLICATIONS

Del Favero, S. etal., On the discardability of data in Support Vector Classification problems, 2011, IEEE, pp. 3210-3215. (Year: 2011).*

Bergshoell, E.A., etal., Wrapping rules (in) string theory, 2018, Springer, 20 pages. (Year: 2018).*

Hastie, Trevor etal., The Entire Regularization Path for Support Vector Machine, 2004, Journal or Machine Research, pp. 1391-1415. (Year: 2004).*

* cited by examiner

APPARATUS AND METHOD FOR GENERATING A VECTOR OF ELEMENTS WITH A WRAPPING CONSTRAINT

BACKGROUND

The present technique relates to the field of data processing. More particularly, it relates to vector processing, and to techniques for generating a vector of elements with a wrapping constraint.

Some data processing systems support processing of vector instructions for which a source operand or result value of the instruction is a vector comprising multiple elements. By supporting the processing of a number of distinct elements in response to a single instruction, code density can be improved and the overhead of fetching and decoding of instructions reduced. An array of data values to be processed can be processed more efficiently by loading the data values into respective elements of a vector operand and processing the data values several elements at a time using a single vector instruction.

In order to support such vector processing, it is desirable to provide efficient techniques for generating vectors of elements that can then be used in subsequent vector processing operations. In some instances, when generating such a vector of elements, consideration needs to be given to a wrapping constraint that may identify bounds within which each element of the vector must be constrained. Such a scenario occurs, for example, when supporting circular addressing to memory within vector processing systems.

As the performance requirements for vector processing systems increase, then this can increase the timing constraints on the circuitry used to generate such vectors of elements. Further, it may be required for such circuitry to support more complex scenarios, such as situations where, taking into account the number of elements that need to be generated within the vector and the wrapping constraints, more than one wrap point may occur during the generation of the vector.

SUMMARY

In one example arrangement, there is provided an apparatus comprising: an input interface to receive a scalar start value, an adjust amount and wrapping control information; vector generating circuitry to generate a vector comprising a plurality of elements such that a value of a first element in the plurality of elements is dependent on the scalar start value, and values of the plurality of elements follow a regularly progressing sequence that is constrained to wrap as required to ensure that each value is within bounds determined from the wrapping control information, with the adjust amount being used to determine a difference between values of adjacent elements in the regularly progressing sequence; the vector generating circuitry comprising: first adder circuitry to generate a plurality of first candidate values for the plurality of elements, assuming absence of a wrapping condition; second adder circuitry to generate a plurality of second candidate values for the plurality of elements, assuming presence of a wrapping condition; wrap detection circuitry to determine an adjustment limit value that provides an indication of a total number L of regularly progressing values differing by the adjust amount that are available within the bounds determined from the wrapping control information, and a current adjustment value that, taking into account the scalar start value, provides an indication of an initial number C of regularly progressing values differing by the adjust amount that are available before the wrapping condition occurs; and result selection circuitry to receive the first candidate values and second candidate values, and to select, for each element in the plurality of elements, one of the first candidate values and the second candidate values, in dependence on at least the adjustment limit value and the current adjustment value.

In another example arrangement, there is provided a method of generating a vector of elements, comprising: receiving a scalar start value, an adjust amount and wrapping control information; and generating a vector comprising a plurality of elements such that a value of a first element in the plurality of elements is dependent on the scalar start value, and values of the plurality of elements follow a regularly progressing sequence that is constrained to wrap as required to ensure that each value is within bounds determined from the wrapping control information, with the adjust amount being used to determine a difference between values of adjacent elements in the regularly progressing sequence; wherein the generating step is performed by: employing first adder circuitry to generate a plurality of first candidate values for the plurality of elements, assuming absence of a wrapping condition; employing second adder circuitry to generate a plurality of second candidate values for the plurality of elements, assuming presence of a wrapping condition; determining an adjustment limit value that provides an indication of a total number L of regularly progressing values differing by the adjust amount that are available within the bounds determined from the wrapping control information; determining a current adjustment value that, taking into account the scalar start value, provides an indication of an initial number C of regularly progressing values differing by the adjust amount that are available before the wrapping condition occurs; and selecting, for each element in the plurality of elements, one of the first candidate values and the second candidate values, in dependence on at least the adjustment limit value and the current adjustment value.

In a still further example arrangement, there is provided an apparatus comprising: input interface means for receiving a scalar start value, an adjust amount and wrapping control information; vector generating means for generating a vector comprising a plurality of elements such that a value of a first element in the plurality of elements is dependent on the scalar start value, and values of the plurality of elements follow a regularly progressing sequence that is constrained to wrap as required to ensure that each value is within bounds determined from the wrapping control information, with the adjust amount being used to determine a difference between values of adjacent elements in the regularly progressing sequence; the vector generating means comprising: first adder means for generating a plurality of first candidate values for the plurality of elements, assuming absence of a wrapping condition; second adder means for generating a plurality of second candidate values for the plurality of elements, assuming presence of a wrapping condition; wrap detection means for determining an adjustment limit value that provides an indication of a total number L of regularly progressing values differing by the adjust amount that are available within the bounds determined from the wrapping control information, and a current adjustment value that, taking into account the scalar start value, provides an indication of an initial number C of regularly progressing values differing by the adjust amount that are available before the wrapping condition occurs; and result selection means for receiving the first candidate values and second candidate values, and for selecting, for each element in the plurality of elements, one of the first candidate values and the second candidate values, in dependence on at least the adjustment limit value and the current adjustment value.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
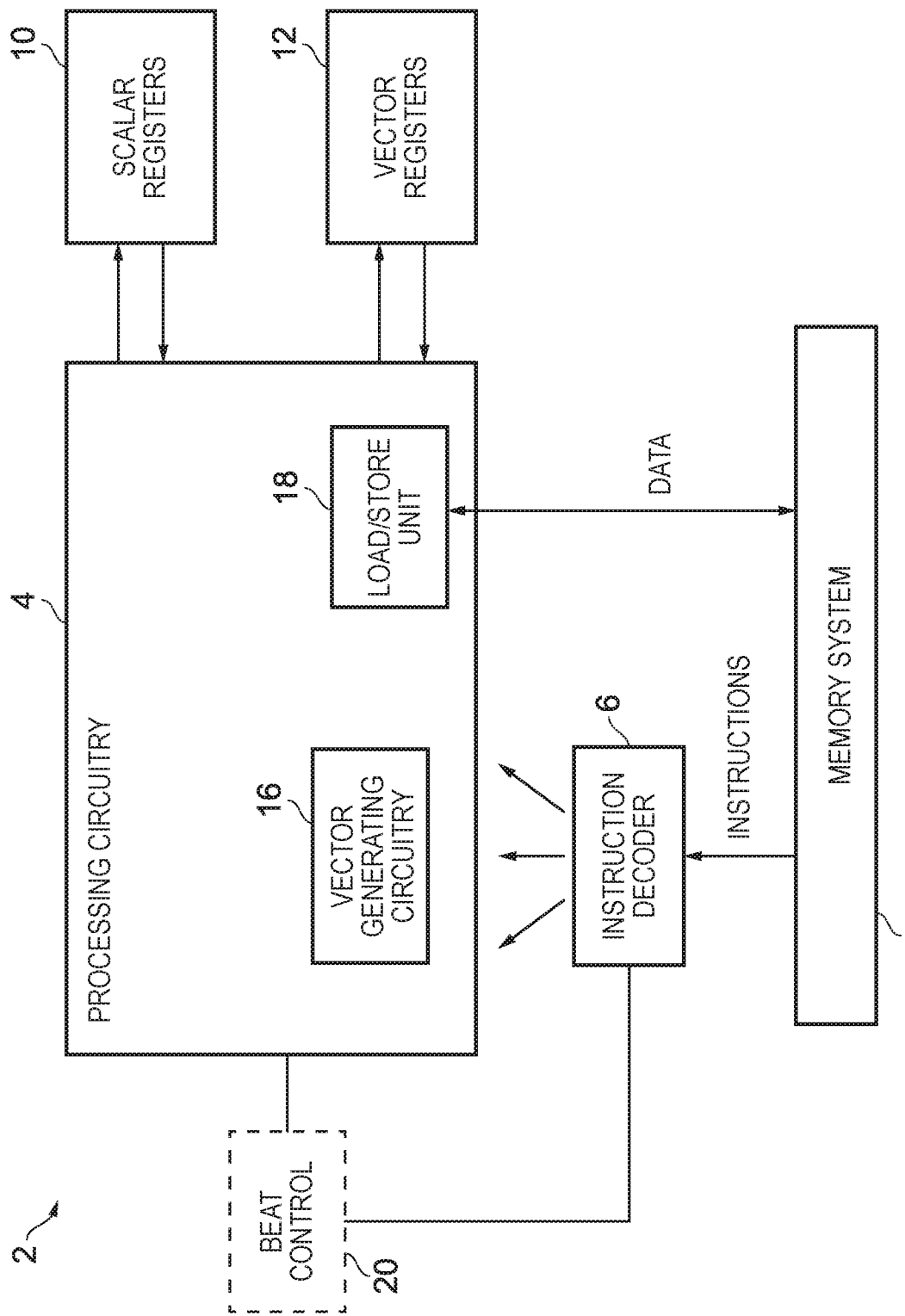
FIG. 1 is a block diagram of an apparatus in accordance with one example arrangement.

Most Digital Signal Processors (DSP) currently available support some form of circular, sometimes also called modulo, addressing modes to memory. Such a feature is useful, as it removes the need for algorithms to perform bounds-checking and allows other optimisations.

An example use case is an FIR filter. This is a common DSP operation that creates a new result from a weighted sum of the N preceding results. With a linear memory arrangement, each time a new sample block needs to be processed, the previous results need to be accessed. This can be done by copying the N last results to the start of the linear buffer and processing from there. However, when employing a circular memory, such a copy step is no longer necessary, as the processing can simply start at the old results, and wrap back to the start of the buffer when the end is reached. Circular buffers thus enable such operations to be performed in a much more efficient manner.

One known approach for supporting circular addressing modes to memory is to provide additional logic within the address generation units (AGUs) provided in the path between the processor and memory. However, in vector processing systems where processing efficiency can be increased by loading multiple data values into respective elements of a vector operand and processing the data values several elements at a time, the access path to memory can become a significant timing constraint, and accordingly it can be difficult to sustain extra logic within that path to support circular addressing modes of operation.

To avoid such timing constraints in the access path to memory, it is known to provide specific instructions for generating vectors of elements taking into account wrapping constraints, and to then provide vector generating circuitry within the processing circuitry that is used to execute instructions, in order to perform an operation in response to such a vector generating instruction so as to generate the required vector of elements. Such vector generating circuitry is described, for example, in commonly owned co-pending US patent application publication US 2019/0369995, the entire contents of which are hereby incorporated by reference. However, in modern vector processing systems, the timing constraints on such vector generating circuitry are becoming increasingly difficult to meet, due to the ever increasing requirements on system performance, and the resultant increase in clock speeds. It is also desirable for such vector generating circuitry to support functionality improvements, such as the possibility of there being multiple wrap points within a single vector of elements. The techniques described herein provide a form of vector generating circuitry that has both improved functionality, and exhibits improved timing, with respect to existing vector generating circuits.

In particular, in one example implementation an apparatus is provided that has an input interface for receiving a scalar start value, an adjust amount and wrapping control information. These parameters can be specified in a variety of ways, but could for example be specified by a particular vector generating instruction that is to be executed on the apparatus.

The apparatus also provides vector generating circuitry that is used to generate a vector comprising a plurality of elements such that a value of a first element in the plurality of elements is dependent on the scalar start value, and values of the plurality of elements follow a regularly progressing sequence that is constrained to wrap as required to ensure that each value is within bounds determined from the wrapping control information. The adjust amount is used to determine a difference between values of adjacent elements in the regularly progressing sequence.

In accordance with the techniques described herein the vector generating circuitry comprises first adder circuitry for generating a plurality of first candidate values for the plurality of elements, assuming absence of a wrapping condition, and second adder circuitry for generating a plurality of second candidate values for the plurality of elements, assuming presence of a wrapping condition. The first and second adder circuits are able to operate independently of each other, and in particular the computations performed by either adder circuit are not dependent on any results produced by the other adder circuit. This hence enables a reduction in logic depth, for example by enabling the first and second adder circuits to be arranged to operate in parallel.

In addition, the vector generating circuitry has wrap detection circuitry for determining an adjustment limit value that provides an indication of a total number L of regularly progressing values differing by the adjust amount that are available within the bounds determined from the wrapping control information. The wrap detection circuitry also determines a current adjustment value that, taking into account the scalar start value, provides an indication of an initial number C of regularly progressing values differing by the adjust amount that are available before the wrapping condition occurs. It should be noted that whilst in one example implementation the adjustment limit value and the current adjustment value may directly identify the numbers L and C, in an alternative implementation they may provide indicative values from which the numbers L and C can be derived, for example in combination with other information.

In one example implementation, the wrap detection circuitry can operate independently of the adder circuits, and in particular can determine the adjustment limit value and the current adjustment value without needing to have any knowledge of the first and second candidate values produced by the first and second adder circuits. Accordingly, this also enables a reduction in the logic depth of the vector generating circuitry, for example by enabling the wrap detection circuitry to operate in parallel with the first and second adder circuits, and hence assists in reducing the time taken by the vector generating circuitry to generate the vector of elements, thereby allowing the vector generating circuitry to operate at high speed, and thus alleviate the earlier-mentioned timing constraints that might otherwise occur. In particular, as the clock speed of the system is increased, by employing such a design this can avoid the vector generating circuitry becoming a critical path within the apparatus.

The apparatus then further comprises result selection circuitry that is arranged to receive both the first candidate values and the second candidate values, and is then arranged to select, for each element in the plurality of elements, one of the first candidate values and the second candidate values. The result selection circuitry is arranged so that it selects the value for each element in dependence on at least the adjustment limit value and the current adjustment value. Whilst in one example implementation the result selection circuitry may be able to operate using only the adjustment limit value and the current adjustment value to make its selection decisions, in one example implementation the adjustment limit value and the current adjustment value are supplemented by certain carry out information from one of the first and second adder circuits. For example, such carry out information can be used to qualify the current adjustment value generated by the wrap detection circuitry.

In one example implementation, the result selection circuitry is arranged to select, for each element within the first C elements of the plurality of elements, a corresponding first candidate value. In particular, the number C identifies the number of regularly progressing values that can be selected before the wrapping condition occurs, and as mentioned earlier the first adder circuitry generates a plurality of first candidate values assuming absence of the wrapping condition. Hence, with knowledge of the number C, the result selection circuitry can merely select corresponding first candidate values for each element within the first C elements.

In some instances it may be the case that the number C is greater than or equal to the total number of elements that need to be generated, and in that instance the value for each element in the vector will be selected to be the corresponding first candidate value from the first adder circuitry. However, in other instances the total number of elements P within the plurality of elements that need to be generated will exceed the initial number C of regularly progressing values. In such instances, the result selection circuitry is arranged to treat each element in the plurality of elements after the first C elements as having the wrapping condition associated therewith. Accordingly, in one example implementation the result selection circuitry is arranged to select, for each element after the first C elements, one of the second candidate values.

However, in one example implementation, which second candidate value is chosen for any given element will depend on the number of wrap points that have occurred prior to that element. In particular, the result selection circuitry is arranged to determine, from the initial number C of regularly progressing values, a first wrap point indicating occurrence of the wrapping condition, and to determine a periodicity of wrap points from the total number L of regularly progressing values. The result selection circuitry is then arranged to determine, for each element after the first C elements, which one of the second candidate values to select in dependence on a number of wrap points that have occurred prior to that element.

In some instances, there may only be a single wrap point that is encountered when generating the values for the P elements. In such instances, the result selection circuitry may be arranged to select, for each element after the first C elements of the plurality of elements, a corresponding second candidate value.

However, when multiple wrap points are encountered when generating the values for the P elements, then in one example implementation the result selection circuitry may be arranged to take into account the periodicity of wrap points when determining, for each element after the first C elements of the plurality of elements, which second candidate value to select for that element.

The wrap detection circuitry can be arranged to operate in a variety of ways. For example, in one implementation it may receive the entirety of the scalar start value and the wrapping control information, and analyse that information, in combination with the adjust amount, in order to determine the adjustment limit value and the current adjustment value. However, in one example implementation, it has been found that the adjustment limit value and the current adjustment value can be reliably determined using only a subset of the bits of the wrapping control information and the scalar start value. In particular, in one example implementation the wrap detection circuitry is arranged to determine the adjustment limit value in the current adjustment value using a determined number of least significant bits of the wrapping control information and the scalar start value. The choice as to how many least significant bits are used may, for example, depend on the maximum supported number of elements that can be generated within the vector, and the maximum supported adjust amount. In particular, the number of least significant bits chosen may increase as the maximum number of elements increases and/or the maximum adjust amount increases.

The wrapping control information can take a variety of forms. The wrapping control information is used to determine the bounds within which the values need to be retained when generating the plurality of elements of the vector. Whilst the wrapping control information may provide sufficient information to enable both a first and a second bound to be determined, in one example implementation the wrapping control information is used to determine a first bound, and a second bound is predetermined. For example, in one implementation the second bound may be a zero value. In such an implementation, the wrapping control information may for example provide a size indication used to determine the first bound. The size indication can take a variety of forms. For example, it may be used to identify a size of a buffer defined by the first and second bounds, thus enabling a determination of a point where the regularly progressing sequence will need to wrap in order to ensure that each value remains within the bounds defined by a buffer of that specified buffer size. Alternatively, the size indication can be used to identify a wrap point indicator, so as to more directly identify a value in the regularly progressing sequence that would cause that value to wrap to a logic zero value (for a regularly increasing sequence) or to identify the value that is wrapped to when the value equals zero (for a regularly decreasing sequence).

There are a number of ways in which the wrap detection circuitry can determine the adjustment limit value and the current adjustment value from the earlier-mentioned determined number of least significant bits of the wrapping control information and the scalar start value. However, in one example implementation the wrap detection circuitry is arranged to apply a right shift to the determined number of least significant bits of the wrapping control information and the scalar start value, in order to generate first and second intermediate values, respectively. The amount of the right shift applied is chosen in dependence on the adjust amount, such that a larger right shift is applied as the adjust amount increases. The wrap detection circuitry is then arranged to determine the adjustment limit value and the current adjustment value from the first and second intermediate values.

In one example implementation, the wrap detection circuitry is arranged to output, as the adjustment limit value, the first intermediate value formed by applying the right shift to the determined number of least significant bits of the wrapping control information. This is the case irrespective of whether the vector generating circuitry is being used to generate a regularly progressing incrementing sequence of values or a regularly progressing decrementing sequence of values.

However, in one example implementation the manner in which the current adjustment value is determined is dependent on whether the regularly progressing sequence is an incrementing sequence or a decrementing sequence. In particular, when the regularly progressing sequence is an incrementing sequence, the wrap detection circuitry may be arranged to generate the current adjustment value by subtracting, from the first intermediate value, the second intermediate value formed by applying the right shift to the determined number of least significant bits of the scalar start value.

Conversely, when the regularly progressing sequence is a decrementing sequence, the wrap detection circuitry may be arranged to determine the current adjustment value directly from the second intermediate value. In this latter case, the current adjustment value could for example be set equal to the second intermediate value, but in one particular implementation the current adjustment value is determined by adding one to the second intermediate value. This is a consequence of the fact that in that particular implementation the first location/value in the buffer defined by the wrapping control information is referred to as location/value 0, and the second intermediate value by itself identifies a location number that is hence one less than the total number of regularly progressing values that can be output before the wrapping condition occurs. Purely by way of example, if the second intermediate value gives a value of 3, then when decrementing through the series 3, 2, 1 and 0 there will be four elements that can have their corresponding values chosen from the first candidate values before the wrapping condition will occur, and the result selection circuitry will thereafter need to begin selecting second candidate values for subsequent elements.

The first and second adder circuits can be organised in a variety of ways. However, in one example implementation each of the first adder circuitry and second adder circuitry are arranged to logically provide separate adder blocks for each candidate value produced. The total number of separate adder blocks that need to be logically provided is dependent on the maximum number of elements that need to be generated in any particular implementation. In one example implementation, each of the first and second adder circuits may provide physically separate adder blocks for each of the maximum number of possible elements that may be generated, and then in some instances some of those adder blocks may not be used when the number of elements being generated is less than that maximum number. However, in alternative implementations the adder circuitry may be arranged to logically combine adder blocks dependent on the number of elements being generated. In one example implementation, a vector length may be fixed, and the number of elements being generated will depend on a data value size to which those elements relate. For example, if the vector length is 128 bits, and the individual data values are 8 bits, then 16 elements need to be generated, and the set of adders within each of the first adder circuitry and the second adder circuitry may be organised to form 16 adder blocks in that instance. However, in an alternative situation where the data value size is 16 bits, the same set of adders can be organised to form 8 adder blocks, and similarly in situations where the data value size is 32 bits, the same set of adders may be organised to form 4 adder blocks. Such an approach can reduce the size and complexity of the adder circuits by enabling different adders to be logically combined dependent on the number of elements being generated.

Irrespective of how the various adder blocks within the first and second adder circuits are formed, then in one example implementation the adder blocks in one of the first adder circuitry and the second adder circuitry are arranged to generate carry out values. Which adder blocks generate carry out values (and in particular whether it is the adder blocks of the first adder circuitry or the second adder circuitry that generate the carry out values) will in one example implementation depend on whether the vector generation circuitry is being used to generate a regularly progressing incrementing sequence or a regularly progressing decrementing sequence.

The result selection circuitry may then be arranged to additionally use the carry out values (in addition to the earlier-mentioned adjustment limit value and current adjustment value) when selecting, for each element in the plurality of elements, one of the first candidate values and the second candidate values.

There are a number of ways in which the carry out value information can be used. However, in one example implementation the result selection circuitry is arranged to use the carry out values in combination with the current adjustment value to determine, in instances where the wrapping condition occurs, a first wrap point that indicates occurrence of the wrapping condition. The combination of the carry out values and the current adjustment value are used in the same manner (other than an inversion of the carry out values), independent of whether the apparatus is being used to generate a regularly progressing increasing sequence or a regularly progressing decreasing sequence. Effectively, in such implementations the initial number C of regularly progressing values is determined with reference to both the current adjustment value and the carry out values.

Further, in one example implementation, the result selection circuitry is arranged to use the carry out values, in combination with the current adjustment value and the adjustment limit value, when determining, for each element after the first C elements, which one of the second candidate values to select. Again, the selections made in dependence on the carry out values, the current adjustment value and the adjustment limit value, are in one example implementation not dependent on whether a regularly progressing incrementing sequence or a regularly progressing decrementing sequence is being generated (other than an inversion of the carry out values used between incrementing and decrementing versions). In particular, the manner in which the current adjustment value was determined by the wrap detection circuitry has already taken that factor into account.

As mentioned earlier, the wrapping control information can take a variety of forms, but in one example implementation a buffer size is determined from the wrapping control information. Further, in one example implementation the regularly progressing sequence to be generated is an incrementing sequence. In one example implementation, the first adder circuitry is then arranged to produce each first candidate value by adding the scalar start value to a multiple of the adjust amount, where the multiple is different for each first candidate value. Further, the second adder circuitry is arranged to produce each second candidate value by subtracting the buffer size from the scalar start value and adding a multiple of the adjust amount, where the multiple is different for each second candidate value, the second adder circuitry also being arranged to generate a carry out value for each second candidate value. Hence, it can be seen that the second adder circuitry assumes the presence of the wrapping condition and hence subtracts the buffer size from the result that would otherwise be obtained by adding a multiple of the adjust amount to the scalar start value, and it is the second adder circuitry that generates the carry out value for each second candidate value to indicate whether the result is in fact negative or not. The second adder circuitry itself does not take account of the number of wraps that may occur. However, this can be taken into account by the result selection circuitry based on the selection made in dependence on the carry out information, the adjustment limit value and the current adjustment value.

In one particular example implementation, the result selection circuitry is arranged to select the value for element M to be a candidate value M amongst the first candidate values when the current adjustment value is greater than M or the carry out value is not set for a second candidate value M. The result selection circuitry is otherwise arranged to select the value for element M to be a candidate value N+X amongst the second candidate values, where N and X are determined by the following criteria:
a the current adjustment value is equal to N
b the carry out value for a second candidate value N is set
c X is less than the adjustment limit value
d M is equal to the sum of a multiple Y of the adjustment limit value, N and X
e M, Y, X, N are all positive integers
where the criteria a to e are only satisfied by one value of N, X and Y for each element.

It should be noted that in the above scenario, in instances where the result selection circuitry is selecting from amongst the second candidate values, the selection is effectively made by a simultaneous equation that can be satisfied by only one value of N, X and Y for any particular element. In practice, all possible values of N, X and Y may be included as an input leg to the corresponding selection block for the element in question.

If instead the regularly progressing sequence to be generated by the vector generating circuitry is a decrementing sequence, then the first and second adder circuits can be organised differently to that described earlier when considering an incrementing sequence. In particular, the first adder circuitry may be arranged to produce each first candidate value by subtracting from the scalar start value a multiple of the adjust amount, where the multiple is different for each first candidate value, the first adder circuitry also being arranged to generate a carry out value for each first candidate value. The second adder circuitry may be arranged to produce each second candidate value by adding the buffer size to the scalar start value and subtracting a multiple of the adjust amount, where the multiple is different for each second candidate value. Again, it can be seen that the second adder circuitry assumes the presence of the wrapping condition by, in this case, adding the buffer size to the result that would otherwise be obtained by subtracting a multiple of the adjust amount from the scalar start value, but does not consider the number of wrap points that may occur. The first adder circuitry generates the carry out values in this implementation, to identify whether the corresponding first candidate value is negative or not. The result selection circuitry can then use the carry out value information, in combination with the earlier-mentioned adjustment limit value and current adjustment value, when deciding which candidate value to choose for any particular element.

In one particular example implementation, the result selection circuitry may be arranged to select the value for element M to be a candidate value M amongst the first candidate values when the current adjustment value is greater than M or the carry out value is set for the candidate value M amongst the first candidate values. The result selection circuitry is otherwise arranged to select the value for element M to be a candidate value N+X amongst the second candidate values, where N and X are determined by the following criteria:
a the current adjustment value is equal to N
b the carry out value for a candidate value N amongst the first candidate values is not set
c X is less than the adjustment limit value
d M is equal to the sum of a multiple Y of the adjustment limit value, N and X
e M, Y, X, N are all positive integers
where the criteria a to e are only satisfied by one value of N, X and Y for each element.

As discussed earlier for the incrementing example, it should be noted that in situations where the result selection circuitry is selecting from amongst the second candidate values, the choice of second candidate value is effectively chosen as a result of a simultaneous equation that can be satisfied by only one value of N, X and Y for any particular element. Again, in one example implementation all possible values of N, X and Y may be included as an input leg to the corresponding selection block for the element in question.

There are various constraints that can be placed on the vector generating circuitry when generating the vector if desired. For example, by constraining the buffer size determined from the wrapping control information to be a multiple of the adjust amount, this can simplify the circuitry required to generate the vector of elements when performing the vector generating operation. In one example implementation, the scalar start value can also be constrained to be a multiple of the adjust amount. By using such constraints, this enables a significant simplification in the circuitry used to generate the vector of elements. In particular, the components required to detect the wrap points can be implemented using equality checking circuitry rather than circuitry that needs to detect greater than or less than conditions.

Particular examples will now be described with reference to the Figures.

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by the architecture. For example, the decoder 6 may interpret the opcodes of the decoded instructions and any additional control fields of the instructions to generate control signals which cause the processing circuitry 4 to activate appropriate hardware units to perform operations such as arithmetic operations, load/store operations or logical operations. The apparatus has a set of scalar registers 10 and a set of vector registers 12. It may also have other registers (not shown) for storing control information used to configure the operation of the processing circuitry. In response to arithmetic or logical instructions, the processing circuitry typically reads source operands from the registers 10, 12 and writes results of the instructions back to the registers 10, 12. In response to load/store instructions, data values are transferred between the registers 10, 12 and the memory system 8 via a load/store unit 18 within the processing circuitry 4. The memory system 8 may include one or more levels of cache as well as main memory.

The set of scalar registers 10 comprises a number of scalar registers for storing scalar values which comprise a single data element. Some instructions supported by the instruction decoder 6 and processing circuitry 4 may be scalar instructions which process scalar operands read from the scalar registers 10 to generate a scalar result written back to a scalar register.

The set of vector registers 12 includes a number of vector registers, each arranged to store a vector value comprising multiple elements. In response to a vector instruction, the instruction decoder 6 may control the processing circuitry 4 to perform a number of lanes of vector processing on respective elements of a vector operand read from one of the vector registers 12, to generate either a scalar result to be written to a scalar register 10 or a further vector result to be written to a vector register 12. Some vector instructions may generate a vector result from one or more scalar operands, or may perform an additional scalar operation on a scalar operand in the scalar register file as well as lanes of vector processing on vector operands read from the vector register file 12. Hence, some instructions may be mixed scalar-vector instructions for which at least one of the one or more source registers and a destination register of the instruction is a vector register 12 and another of the one or more source registers and the destination register is a scalar register 10.

Vector instructions may also include vector load/store instructions which cause data values to be transferred between the vector registers 12 and locations in the memory system 8. The load/store instructions may include contiguous load/store instructions for which the locations in memory correspond to a contiguous range of addresses, or scatter/gather type vector load/store instructions which specify a number of discrete addresses and control the processing circuitry 4 to load data from each of those addresses into respective elements of a vector register or to store data from respective elements of a vector register to the discrete addresses.

The processing circuitry 4 may support processing of vectors with a range of different data element sizes. For example, a 128-bit vector register 12 could be partitioned into sixteen 8-bit data elements, eight 16-bit data elements, four 32-bit data elements or two 64-bit data elements. A control register may be used to specify the current data element size being used, or alternatively this may be a parameter of a given vector instruction to be executed.

The processing circuitry 4 may include a number of distinct hardware blocks for processing different classes of instructions. For example, load/store instructions which interact with the memory system 8 may be processed by a dedicated load/store unit 18, whilst arithmetic or logical instructions could be processed by an arithmetic logic unit (ALU). The ALU itself may be further partitioned into a multiply-accumulate unit (MAC) for performing operations involving multiplication, and a further unit for processing other kinds of ALU operations. A floating-point unit can also be provided for handling floating-point instructions. Pure scalar instructions which do not involve any vector processing could also be handled by a separate hardware block compared to vector instructions, or re-use the same hardware blocks.

As will be discussed in more detail with reference to the remaining figures, in accordance with one example implementation vector generating circuitry 16 is provided within the processing circuitry 4 that is arranged to perform operations required by a vector generating instruction that may be included within the sequence of instructions executed by the apparatus 2. The vector generating circuitry 16 could comprise a dedicated block within the processing circuitry 4, or may be incorporated within one of the other circuit blocks such as the ALU.

In accordance with some of the examples described herein, a vector generating instruction may be defined that identifies a scalar start value and wrapping control information. When such an instruction is decoded by the instruction decoder 6, control signals are sent to the processing circuitry 4 to cause the vector generating circuitry 16 to generate a vector comprising a plurality of elements, with that generated vector then typically being stored within one of the vector registers 12. The vector generating circuitry 16 is arranged to generate the vector such that the first element in the vector is dependent on the scalar start value, and the values of the plurality of elements then follow a regularly progressing sequence that is constrained to wrap as required to ensure that each value is within bounds determined from the wrapping control information. The regularly progressing sequence can be a regularly increasing sequence or a regularly decreasing sequence, and in one example implementation different variants of the vector generating instruction are specified for both increasing and decreasing sequences.

Such a generated vector of elements can be useful in a variety of situations. However, one particular use case where such a vector is very useful is as an input operand for the earlier-mentioned vector gather/scatter load/store instructions. In particular, in one example implementation, the vector generated by the vector generating instruction can be used as a vector of offsets provided as an input operand for such a vector load/store instruction that causes gather/scatter operations to be performed. Such instructions typically also receive a scalar input specifying a base address, and the vector of offsets is then used to generate each of the addresses to be accessed in memory with reference to that base address. Whilst such vector load or store instructions can be used to access an arbitrary set of addresses within the memory, when using a vector of offsets generated by the above-mentioned vector generating instruction, this enables a sequence of addresses to be identified that reside within a circular buffer within memory. Hence, this mechanism provides a very efficient technique for employing circular addressing modes in memory, without needing to add additional circuitry into the memory access path, and hence avoiding the potential performance impact that such additional circuitry would introduce within that path. This provides significant benefits in vector processing systems, where the memory access path is often a critical timing path within the system.

As also shown in FIG. 1, beat control circuitry 20 can be provided if desired to control the operation of the instruction decoder 6 and the processing circuitry 4. In particular, in some implementations the execution of the vector instruction may be divided into parts referred to as "beats", with each beat corresponding to processing of a portion of a vector of a predetermined size. This can allow for overlapped execution of the vector instructions, thereby improving performance.

Figure 2:
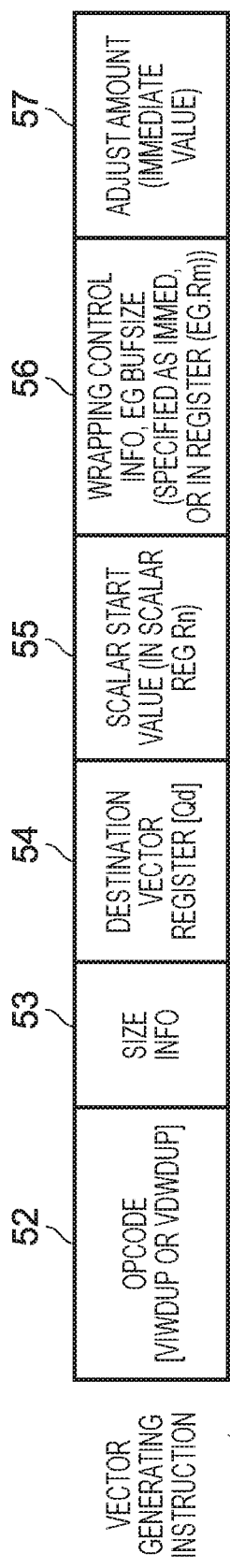
FIG. 2 schematically illustrates fields provided within a vector generating instruction that may be used in one example implementation.

FIG. 2 is a diagram schematically illustrating fields that may be provided within a vector generating instruction of the type discussed above. In particular, the instruction 50 may include a first field 52 specifying the opcode of the instruction. This can be used to identify that the instruction is the vector generating instruction, and can also be used to identify different variants of the instruction, such as incrementing or decrementing variants. In one particular example implementation, the incrementing variant of the vector generating instruction is referred to as a vector increment and wrap duplicate (VIWDUP) instruction, whilst the decrementing version is referred to as a vector decrement and wrap duplicate (VDWDUP) instruction. The "duplicate" reference is merely intended to identify that the value determined for each of the elements of the vector is derived from a scalar seed value, the actual value for each element being in this case an incremented or decremented version of the preceding element value, with the initial element value derived from the scalar seed value.

In one example implementation a size information field 53 is provided within the instruction to identify the size of the data values within a vector. In particular, where the processing circuitry allows data values of different sizes to be processed within a vector, then such a field can be used to identify the particular data value size to which the current instruction relates. In alternative implementations, such size information may not be required, as the data value size may be predetermined.

The destination vector register field 54 identifies a vector register (for example referred to in FIG. 2 as the register Qd) into which the vector of elements generated by executing the instruction is to be written. The field 55 provides a scalar start value, which in one example implementation is identified with reference to one of the scalar registers (in the example of FIG. 2 this being referred to as the scalar register Rn).

A wrapping control information field 56 is also provided to identify wrapping information that is used to identify bounds, i.e. the points at which a regularly increasing sequence or a regularly decreasing sequence of values will need to wrap. In one particular example implementation, the wrapping control information is used to determine a first bound, and the second bound is predetermined. More particularly, in one example implementation the second bound is assumed to be a zero value. In such implementations, the wrapping control information can for example provide size information, referred to herein as a buffer size or "BUFSIZE", and given that the second bound is predetermined, this enables the value of the first bound to be identified. The wrapping control information can be specified as an immediate value within the instruction, or could instead be identified with reference to a register, either one of the scalar registers 10 or one of the vector registers 12. In one example implementation, the wrapping control information is specified by a further scalar register, and in the example of FIG. 2 this is referred to as the scalar register Rm.

In one example implementation the data values subjected to vector processing may be of a predetermined size, but in alternative implementations the data value size may be varied, such that when executing some instructions the data values are assumed to be of a first size, whilst when executing other instructions they are assumed to be of a different size. In implementations that support different data value sizes, then the vector generating instruction 50 may include an adjust amount field 57 which can be specified in one example implementation as an immediate value, but which could alternatively be specified by the contents of a register. When the instruction is executed, the adjust amount will determine the amount by which each element is increased or decreased within the regularly progressing sequence. As mentioned earlier, in one example implementation the vector generated by the vector generating instruction will be used as a vector of address offsets for a subsequent vector load or store instruction, and hence the adjust amount can be set having regard to the size of the data values that will be accessed by that subsequent vector load or store instruction. For example, in one example implementation the adjust amount will be set to one if the data values that are subsequently to be accessed are byte size data values, will be set to two if the data values are 16-bits entities, will be set to four if the data values are 32-bit entities and will be set to eight if the data values are 64-bit entities.

Figure 3:
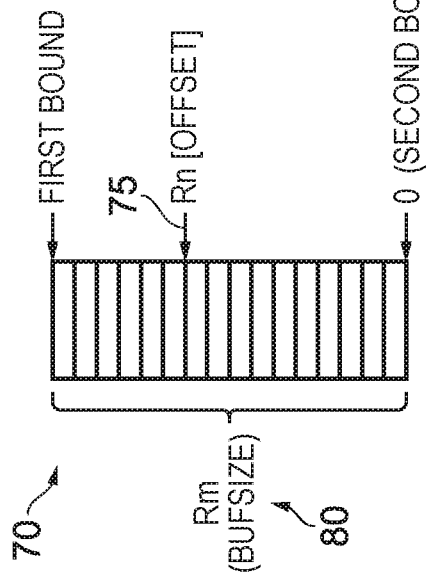
FIG. 3 schematically illustrates vectors of elements that can be generated for particular examples of scalar start value, adjust amount and wrapping control information, when using the techniques described herein.

The manner in which the vector of elements is generated when executing the vector generating instruction is illustrated in more detail with reference to the particular example of FIG. 3. In this example, it is assumed that the vector generating instruction is the VIWDUP instruction, i.e. the incrementing variant. As shown in FIG. 3, a logical buffer 70 is identified having a second bound which is assumed to have a zero value, and a first bound that is identified with reference to the buffer size 80. The scalar start value 75 identifies a particular point within that logical buffer that is used as a starting value. In the example illustrated in FIG. 3, the buffer size is assumed to be 16, i.e. 16 bytes, and it is assumed that the vector length is 128 bits. The buffer size has been chosen to be relatively small purely for illustration, since this helps to illustrate the wrapping behaviour of the operation for each of the three examples shown in FIG. 3. In practice, the buffer size may be significantly larger, so that occurrences of wrapping taking place when generating any particular instance of the vector will be reduced.

As illustrated in example one, it is assumed that the adjust amount is set to one, i.e. indicating that the associated data value size is 8 bits, and the scalar start value is set to nine, this resulting in the generation of the vector shown in example one containing sixteen entries (the initial element being the right-hand side element), one for each of the 8-bit sized data values. As can be seen, the elements within the vector follow a regularly increasing sequence, but wrap at the point where the value would have been incremented to the first bound value, at that point the sequence returning to zero and then increasing thereafter.

Example two shows a situation where the adjust amount is set to two, i.e. identifying that the associated data values are 16 bits in size. It is assumed in this instance that the scalar start value is ten, and this results in the generation of the vector shown in FIG. 3 having eight elements, one for each of the 16-bit sized data values within a 128-bit vector. Again, the wrap point is seen to occur where the value would have been incremented to the first bound value, but instead is then wrapped back to a logic zero value.

Example three shows an example where the adjust amount is set to four, indicating that the data value size is 32 bits. In this example, the initial scalar start value is eight, and this results in the generation of the vector of elements shown in FIG. 3, where there are four elements within the vector, one for each of the 32-bit data values within a 128-bit vector. Again, it can be seen that a wrapping occurs at the appropriate point.

The use of a specific instruction to generate vectors of this type provides a great deal of flexibility with regard to the specification of circular buffers in memory. In principle, such circular buffers can be of any size, and at any location within the memory, and indeed if desired multiple buffers can be defined that overlap within the memory address space.

In one example implementation, a number of constraints can be placed on the specification of the buffer size and the scalar start value, in order to simplify the circuitry required to implement the vector generating operation. For example, in one example implementation the buffer size may be constrained to be a multiple of the adjust amount. In addition, if desired, the scalar start value can be constrained to be a multiple of the adjust amount. These two constraints can be seen to be in place for the three examples illustrated in FIG. 3. By using such constraints, the circuitry required to detect the wrap points can be implemented in at least some example implementations using equality checking circuitry rather than circuitry that needs to detect greater than or less than conditions.

The functionality implemented when executing either the VIWDUP or the VDWDUP instructions can be illustrated as follows:

```
VINDUP.<size> Qd, Rn, Rm, #imm    with imm restricted to {1,2,4,
                                                          8}
offset = Rn;      // Rn specifies current offset
bufsize = Rm;     // Rm specifies size of buffer in bytes
for e = 0 . . . N
   Qd[e] = offset;
   offset = offset + imm;
   if offset == bufsize → offset = 0;
Rn = offset;
VDWDUP.<size> Qd, Rn, Rm, #imm    with imm restricted to {1,2,4,
                                                          8}
offset = Rn;      // Rn specifies current offset
bufsize = Rm;     // Rm specifies size of buffer in bytes
for e = 0 . . . N
   Qd[e] = offset;
   if offset == 0    → offset = bufsize - imm;
   else              → offset = offset - imm;
Rn = offset;
```

Figure 4:
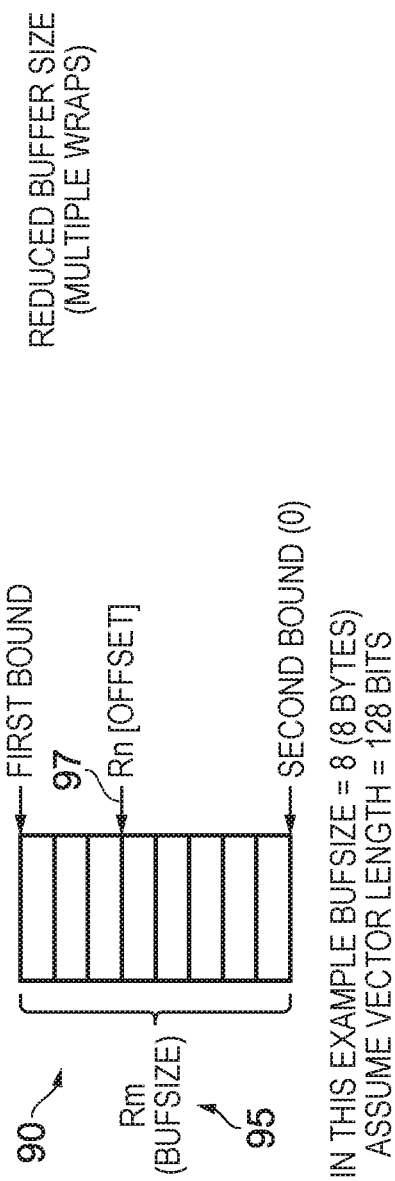
FIG. 4 schematically illustrates vectors of elements that can be generated for particular examples of scalar start value, adjust amount and wrapping control information, when using the techniques described herein, where the number of wrap points is more than one.

Whilst in the examples shown in FIG. 3, there is only a single wrap point within the vector of elements generated by the vector generating circuitry, the vector generating circuitry described herein is also capable of handling situations where there are multiple wrap points. Particular examples where multiple wrap points occur are shown in FIG. 4. As with FIG. 3, it is assumed that the vector generating instruction is the VIWDUP instruction, i.e. the incrementing variant. As shown in FIG. 4, a logical buffer 90 is identified having a second bound which is assumed to have a zero value, and a first bound that is identified with reference to the buffer size 95. The scalar start value 97 identifies a particular point within that logical buffer that is used as a starting value. In the example illustrated in FIG. 4, the buffer size is assumed to be 8, i.e. 8 bytes, and again it is assumed that the vector length is 128 bits.

In example one of FIG. 4, it is assumed that the adjust amount is set to one, i.e. identifying that the associated data value size is 8 bits, and the scalar start value is set to five, this resulting in the generation of the vector shown in example one containing sixteen entries, one for each of the 8-bit sized data values. As can be seen, the elements within the vector follow a regularly increasing sequence, but wrap at the point where the value would have been incremented to the first bound value, at that point the sequence returning to zero and then increasing thereafter. As is clear from the first example, there are two wrap points within the vector generated.

Example two shows a situation where the adjust amount is set to two, i.e. identifying that the associated data values are 16 bits in size. It is assumed in this instance that the scalar start value is six, and this results in the generation of the vector shown in FIG. 4 having eight elements. Again, it can be seen that two wrap points are encountered during the generation of the vector.

Example three shows an example where the adjust amount is set to four, indicating that the data value size is 32 bits. In this example, the initial scalar start value is four, and this results in the generation of the vector of elements shown in FIG. 4, where there are four elements within the vector. Again, it can be seen that two wrap points are encountered.

In accordance with the techniques described herein, a particular form of vector generating circuitry is described that improves functionality and timing over existing implementations. The timing improvements are made by reducing the logic depth of the data path and the functionality improvements are made by enabling detection of multiple wraps per vector.

Figure 5:
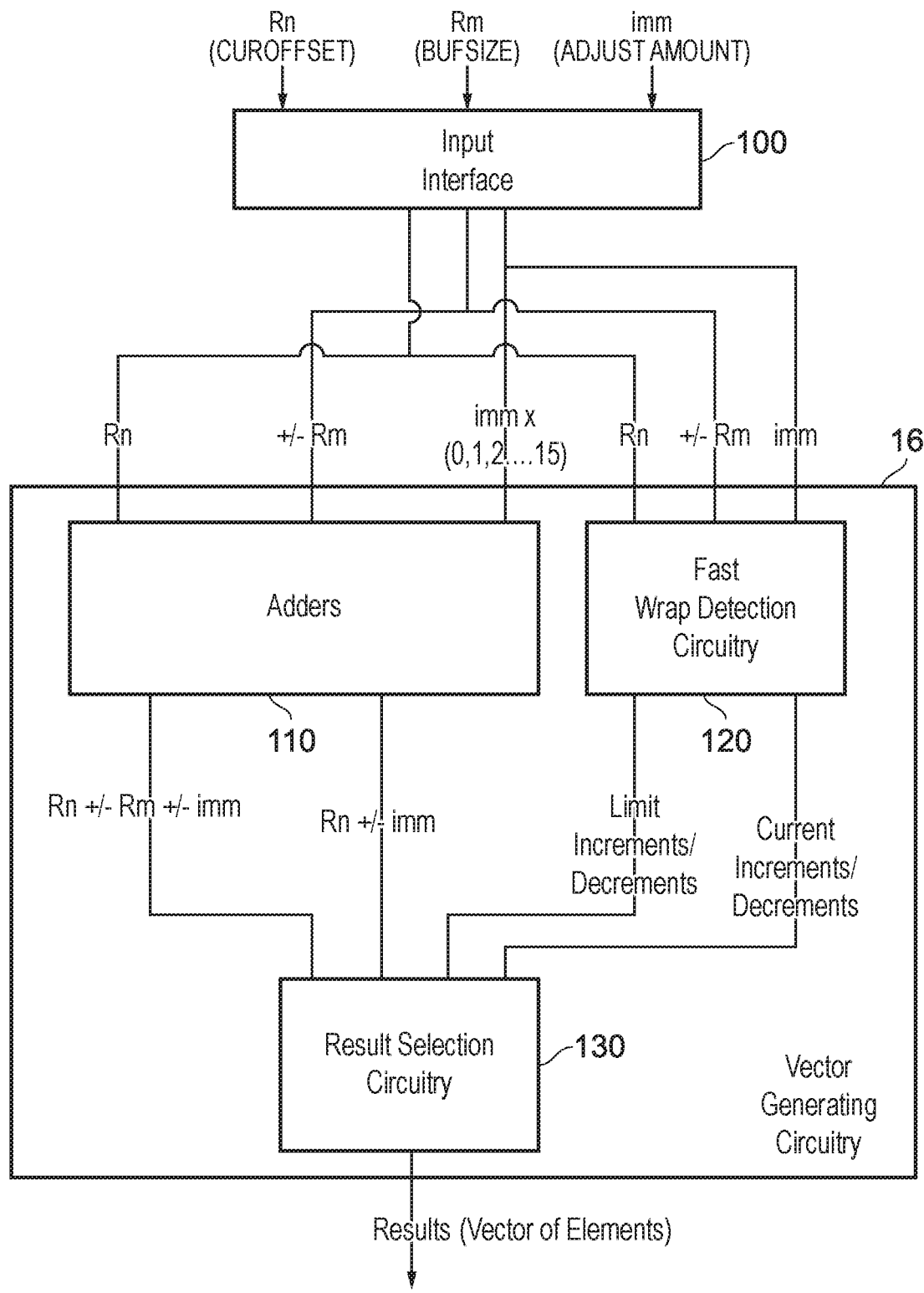
FIG. 5 is a block diagram of vector generating circuitry used in one example implementation.

FIG. 5 is a block diagram illustrating the form of vector generating circuitry 16 used in the implementations described herein. As shown, the vector generating circuitry 16 is provided with a plurality of inputs via an input interface 100. In particular, the input interface receives wrapping control information Rm, in this particular implementation the wrapping control information taking the form of a buffer size indication, and also receives a scalar start value Rn which is also referred to herein as a current offset indication. Further, an adjust amount is specified, that in this example takes the form of an immediate value. As discussed earlier, the adjust amount is used to determine a difference between values of adjacent elements in the regularly progressing sequence generated by the vector generating circuitry.

Each of these three inputs is provided both to the adder circuits 110 and the fast wrap detection circuitry 120. More detail of the components provided within these blocks will be discussed later with reference to FIGS. 7A and 7B, but in general terms the adder circuits 110 include first adder circuitry for generating a plurality of first candidate values for the plurality of elements that are to be generated by the vector generating circuitry, these first candidate values assuming absence of a wrapping condition. The adder circuits 110 also include second adder circuitry for generating a plurality of second candidate values for the plurality of elements, assuming presence of the wrapping condition. These first and second adder circuits can operate in parallel, as neither adder circuitry requires as its input the output from the other adder circuitry, and instead can operate directly from the current offset, buffer size and adjust amount information.

The fast wrap detection circuitry 120 also receives the earlier-mentioned three input values and determines two values. In particular, it determines an adjustment limit value that provides an indication of a total number L of regularly progressing values differing by the adjust amount that are available within the bounds determined from the buffer size information, and also determines a current adjustment value that, taking into account the scalar start value (i.e. the current offset value), provides an indication of an initial number C of regularly progressing values differing by the adjust amount that are available before the wrapping condition occurs. The fast wrap detection circuitry 120 computes these two values based solely on the current offset, buffer size and adjust amount information, and in particular requires no access to the results of the adder circuits 110. Hence, the fast wrap detection circuitry 120 can also operate in parallel with the adder circuits 110, thus providing a significantly reduced logical depth when compared with other implementations.

The actual computations performed by the first and second adder circuits within the adder circuitry 110 will depend on whether the vector generating circuitry 16 is seeking to produce a regularly progressing incrementing sequence (as would for example be the case when operating in response to the earlier-mentioned VIWDUP instruction), or is seeking to generate a regularly progressing decrementing sequence (as would be the case when operating in response to the earlier-mentioned VDWDUP instruction). More details of the exact computations performed by the first and second adder circuits will be discussed later with reference to FIGS. 7A and 7B for both the VIWDUP and VDWDUP examples.

Similarly, the computations performed within the fast wrap detection circuitry 120 will depend on whether an incrementing sequence or a decrementing sequence is being generated, and the adjustment limit value is referred to in FIG. 5 as a limit increments value when an incrementing sequence is being generated and a limit decrements value when a decrementing sequence is being generated. Similarly, the current adjustment value is referred to in FIG. 5 as a current increments value when generating an incrementing sequence and a current decrements value when generating a decrementing sequence.

Due to the way in which the adder circuits 110 and fast wrap detection circuitry 120 operates, dependent on whether an incrementing sequence or a decrementing sequence are being generated, the result selection circuitry 130 can take essentially the same form, irrespective of whether an incrementing or a decrementing sequence is being generated. The result selection circuitry 130 can effectively be considered to be multiplexing circuitry that chooses, for each element in the vector, one of the first candidate values generated by the first adder circuitry or the second candidate values generated by the second adder circuitry, dependent on at least the adjustment limit value and the current adjustment value generated by the fast wrap detection circuitry 120.

As will be discussed in more detail later with reference to FIGS. 7A and 7B, in one example implementation the fast wrap detection circuitry 120 only needs to review a certain number of least significant bits of the current offset value and the buffer size in order to provide indications of the earlier-mentioned number L of regularly progressing values that are available within the bounds, and the number C of regularly progressing values that are available before the wrapping condition occurs, taking into account the current offset value, and the result selection circuitry 130 uses the adjustment limit value and the current adjustment value generated by the fast wrap detection circuitry, in combination with carry out information generated by the adder circuitry 110, in order to determine which candidate value to select as the output value for each element in the vector.

Figure 6:
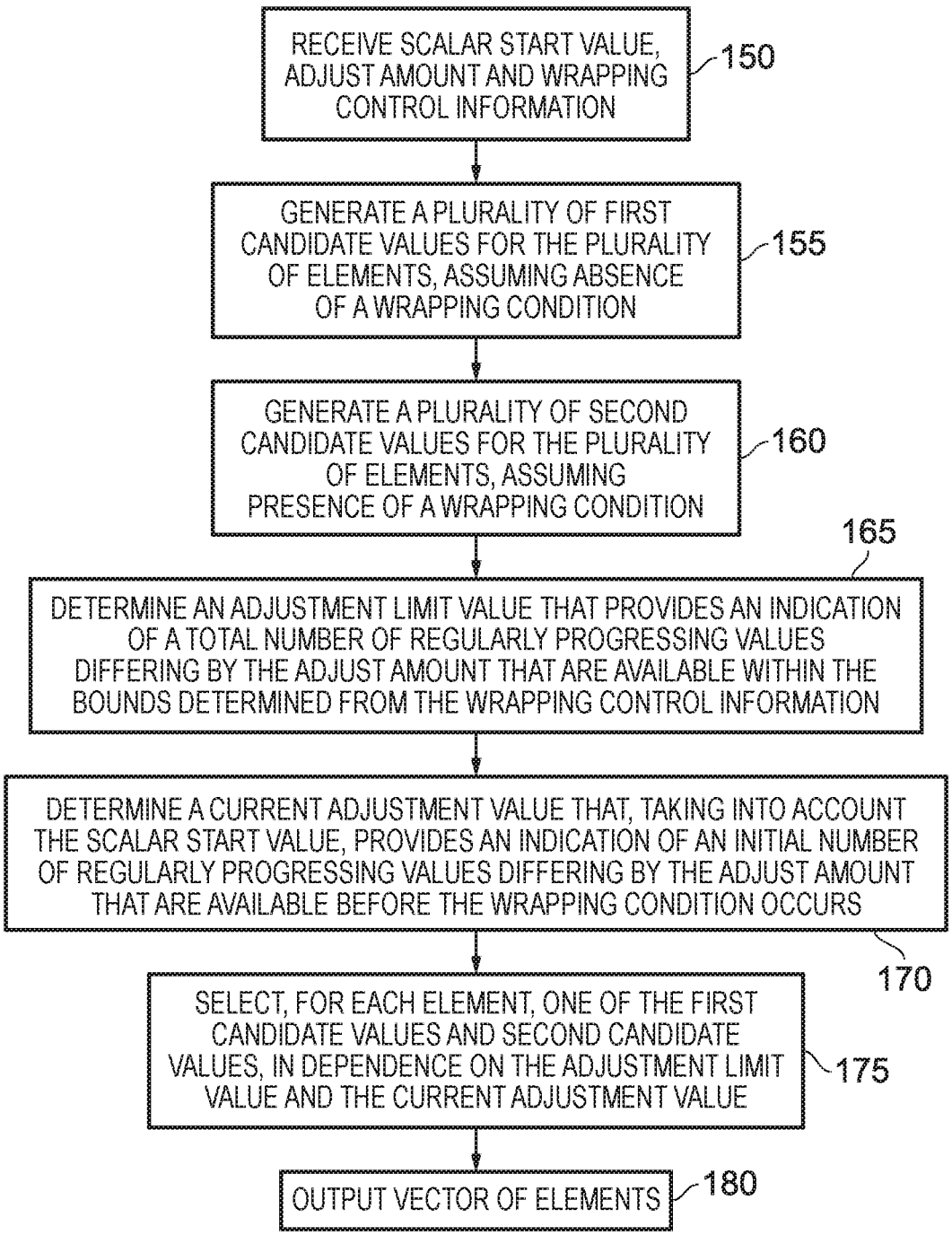
FIG. 6 is a flow diagram illustrating the operation of the vector generating circuitry of FIG. 5 in accordance with one example implementation.

FIG. 6 is a flow diagram illustrating the operation of the vector generating circuitry of FIG. 5, in one example implementation. At step 150, the scalar start value, adjust amount and wrapping control information are received. How these particular values are provided may vary dependent on implementation, but in one example implementation this information will be specified by a vector generating instruction that is to be executed on the apparatus, for instance the earlier-mentioned VIWDUP or VDWDUP instructions.

At step 155, a plurality of first candidate values for the plurality of elements are generated by first adder circuitry within the adders 110, assuming absence of a wrapping condition. At step 160, a plurality of second candidate values for the plurality of elements are generated by second adder circuitry within the adders 110, assuming presence of a wrapping condition. As discussed earlier, the first and second adder circuits can be arranged to operate in parallel, and accordingly steps 155 and 160 may be performed in parallel.

At step 165 an adjustment limit value is determined that provides an indication of a total number of regularly progressing values differing by the adjust amount that are available within the bounds determined from the wrapping control information. Also, at step 170, a current adjustment value is determined that, taking into account the scalar start value, provides an indication of an initial number of regularly progressing values differing by the adjust amount that are available before the wrapping condition occurs. As will be apparent from the earlier discussion, both steps 165 and 170 can be performed by the fast wrap detection circuitry 120, and can also be performed in parallel with steps 155 and 160.

At step 175, the result selection circuitry 130 is used to select, for each element, one of the first candidate values and second candidate values, in dependence on the adjustment limit value and the current adjustment value. As discussed earlier, carry out information from the adders can also be factored into the selection process performed within the result selection circuitry. At step 180, a vector of elements can then be output from the vector generating circuitry, where the value of each element has been determined using the selecting step 175.

Figure 7A:
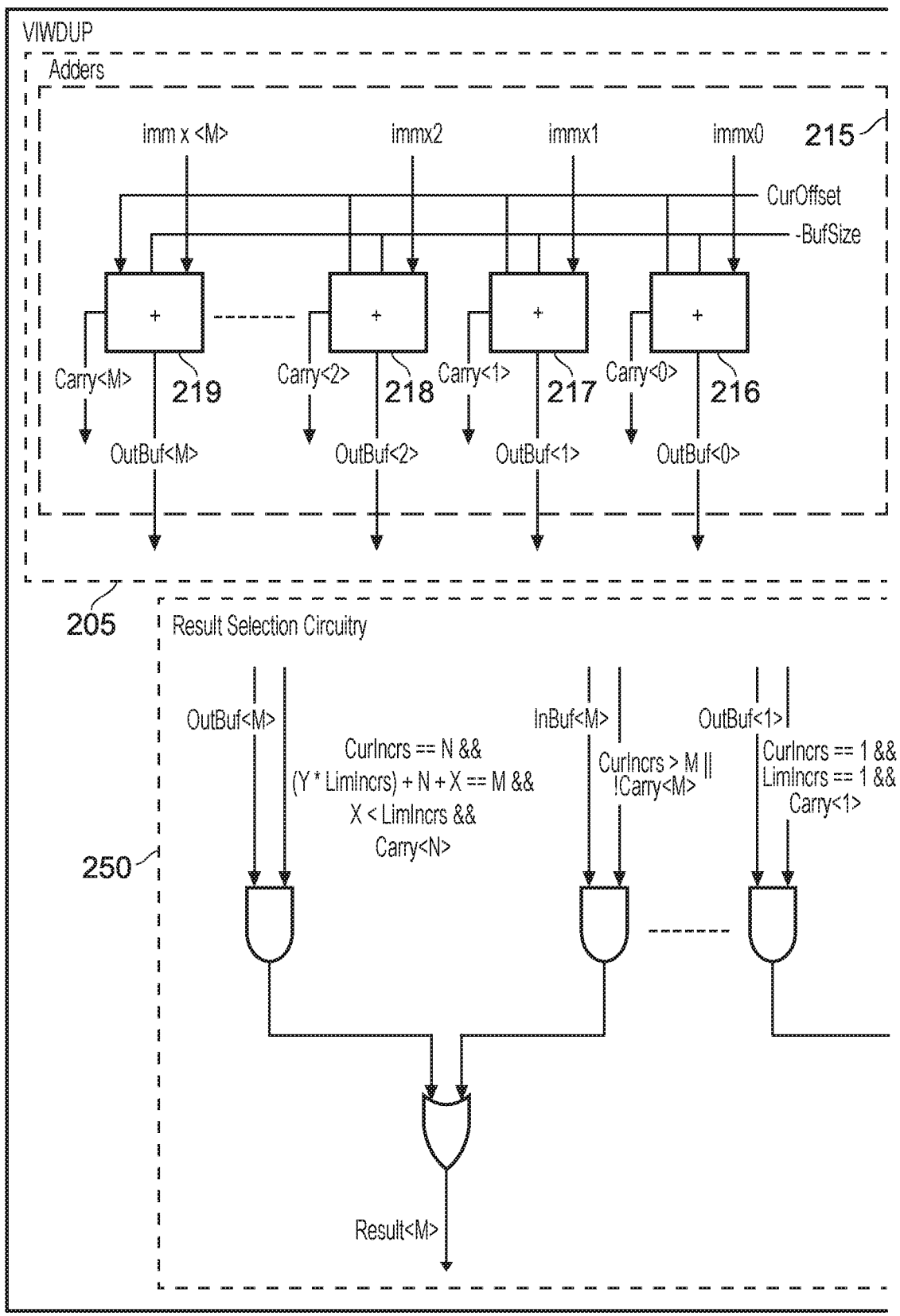
FIG. 7A illustrates in more detail components provided within the vector generating circuitry used in one example implementation to generate a vector of elements where the elements follow a regularly progressing incrementing sequence that is constrained to wrap as required by wrapping control information.
Figure 7A:
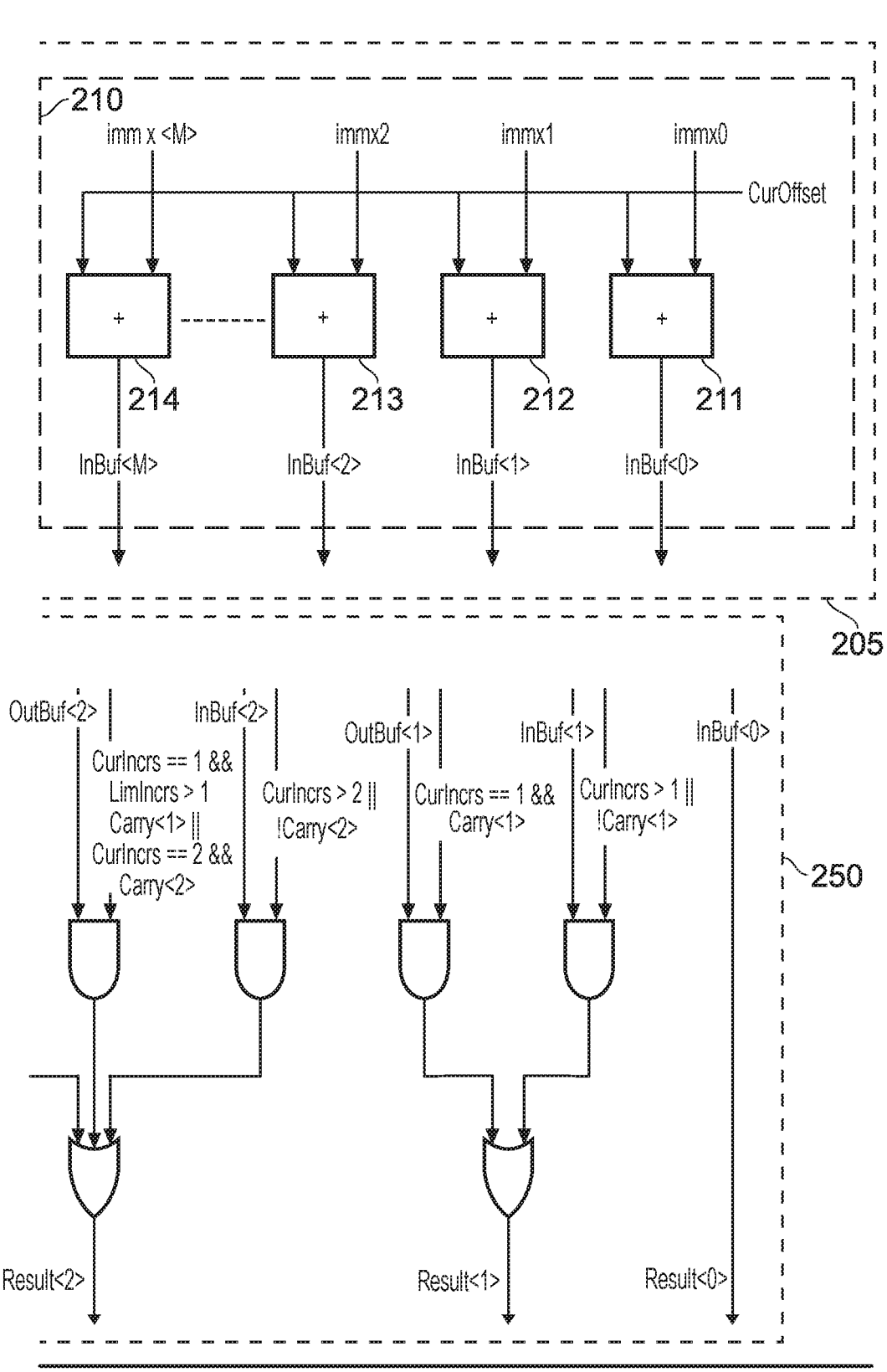
Figure 7A:
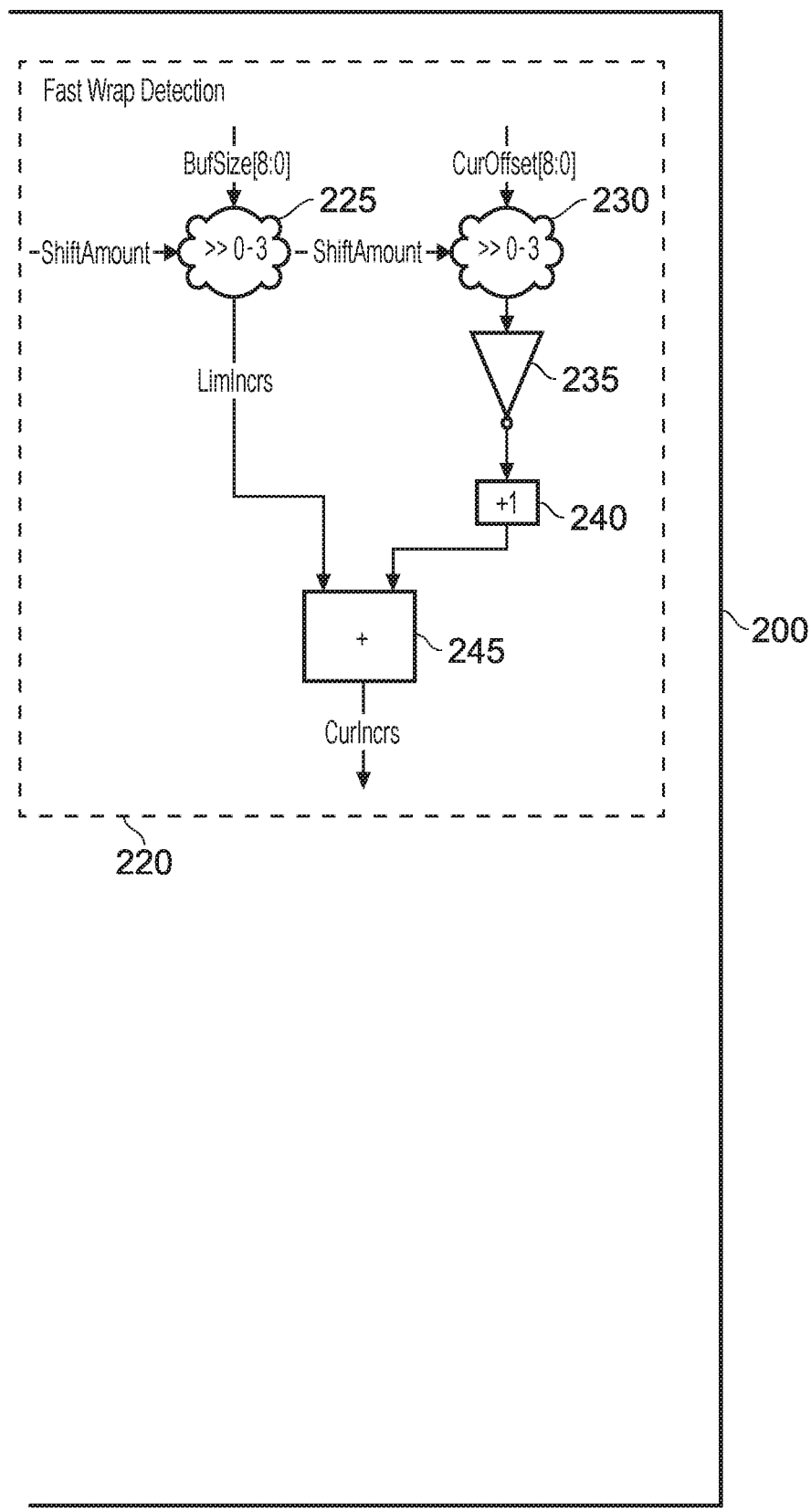

FIG. 7A illustrates one example form of the vector generating circuitry of FIG. 5 used to generate a vector of elements that includes a regularly progressing incrementing sequence, as for example may occur when processing a VIWDUP instruction. As shown in FIG. 7A, the vector generating circuitry 200 includes adder circuitry 205, which itself can be considered to be formed of first adder circuitry 210 and second adder circuitry 215. The first adder circuitry 210 includes a sequence of adder blocks 211, 212, 213, 214, and similarly the second adder circuitry 215 includes a sequence of adder blocks 216, 217, 218, 219. Each of the adder blocks is provided with an associated multiple of the immediate value. It will be appreciated that the number of adder blocks required (assuming all of the elements of the vector are to be generated in parallel) is dependent on the data value size. Considering the three examples discussed earlier with reference to FIGS. 3 and 4, it will be seen that the vector to be generated will either have four elements, eight elements or sixteen elements, depending on the data value size (and assuming a vector length of 128 bits), and hence "M" in FIG. 7A may be 3, 7 or 15. Whilst in FIG. 7A discrete adder blocks are shown, the first and second adder circuits 210, 215 can be provided with a particular arrangement of adder circuits that can be logically combined as required in order to provide the required number of adder blocks taking into account the number of elements within the vector. It will also be noted that whilst in the above example a situation where the number of data elements may be four, eight or sixteen was discussed, the functionality of the circuit can be extended to any number of elements if desired.

The first adder circuitry 210 includes a series of adder blocks 211, 212, 213, 214 that, as mentioned earlier, each receive an associated multiple of the immediate value, but in addition each adder block also receives the current offset value, and as a result produces a corresponding first candidate value that assumes absence of the wrapping condition. Hence, the first adder circuitry 210 takes no account of a bound determined from the buffer size information, and instead merely adds a different multiple of the immediate value to the current offset value in order to generate each first candidate value.

In contrast, the second adder circuitry 215 includes a series of adder blocks 216, 217, 218, 219 that are three input adders, rather than the two inputs adders within the first adder circuitry. The third input is used to subtract the buffer size from the equivalent addition that would have been performed by the corresponding adder block within the first adder circuitry, and hence generates a second candidate value for each element, assuming presence of the wrapping condition. As shown in FIG. 7A, a carry out value is provided by each adder block 216, 217, 218, 219, which effectively identifies whether the output from the adder is negative or not. Whilst the carry out bit is not set, this means that the wrapping condition has not yet been encountered and accordingly it is safe to select, for a corresponding element, the first candidate value from the first adder circuitry 210.

Considering now the fast wrap detection circuitry 220, the least significant eight bits of the buffer size and current offset value are in this case input to the fast wrap detection circuitry, and those selected least significant bits are subjected to right shift operations by the right shift logic 225, 230, where the amount of the right shift is dependent upon the specified adjust amount, i.e. the earlier-mentioned immediate value. In particular, this shift amount is set to 0, 1, 2 or 3 dependent on whether the adjust amount is set to 1, 2, 4 or 8 respectively. The number of least significant bits of the buffer size and current offset values that need to be considered is dependent upon the maximum number of elements that would be produced within the vector and the maximum adjust amount. In one example, the maximum number of elements is 16 and the maximum adjust value is 8, and in such cases using the least significant 9 bits is enough to give sufficient precision taking into account the maximum adjustment value of 8, and hence a maximum right shift of 3.

The output from the right shift logic 225 gives a limit increments value, which is considered to be the earlier-mentioned adjustment limit value for the scenario where an incrementing sequence is to be generated. Hence, the shifted value of the buffer size gives an indication of the number of increments in the entirety of the buffer. The adder circuitry 245 is then used to subtract the right shifted version of the current offset value produced by the right shift logic 230 from the limit increments value, this being achieved in the example of FIG. 7A by inverting the output from the shift logic 230 using the inverter 235, adding 1 to that value using the adder 240, and then performing an addition within the adder circuit 245. The output from the adder circuit is then the current increments value, which is the earlier-mentioned current adjustment value for the scenario where an incrementing sequence is being generated. This hence identifies the number of increments remaining in the buffer, taking into account the scalar start value.

The result selection circuitry 250 then takes the form shown in FIG. 7A. It can be considered to comprise multiplexing circuitry used to output, for each element in the result vector, one of the first candidate values or second candidate values produced by the first adder circuitry 210 and the second adder circuitry 215, respectively. In the example shown in FIG. 7A, the multiplexing functionality is implemented by the series of AND gates and OR gates shown in FIG. 7A. The operation of the result selection circuitry 250 in order to produce the final result containing the vector of elements can be considered to use the outputs from the fast wrap detection circuitry 220 and the adder circuitry 205 as follows:

1) 'Result<M>' is set to 'InBuf<M>' if 'CurIncrs' is greater than 'M' or 'Carry<M>' is not set.
2) 'Result<M>' is set to 'OutBuf<N+X>' if:
   a. 'CurIncrs' is equal to 'N'
   b. 'Carry<N>' is set
   c. 'X' is less than 'LimIncrs'
   d. 'M' is equal to the sum of a multiple 'Y' of 'LimIncrs', 'N' and 'X'
   e. 'M', 'Y', 'X', 'N' are all positive integers Note that, case 2 is a simultaneous equation that can be satisfied by only one value of 'N', 'X', 'Y' for each element. In practice, all possible values of 'N', 'X', 'Y' are included as an input leg to the corresponding element mux but this has not been shown on the diagram for brevity.

Figure 7B:
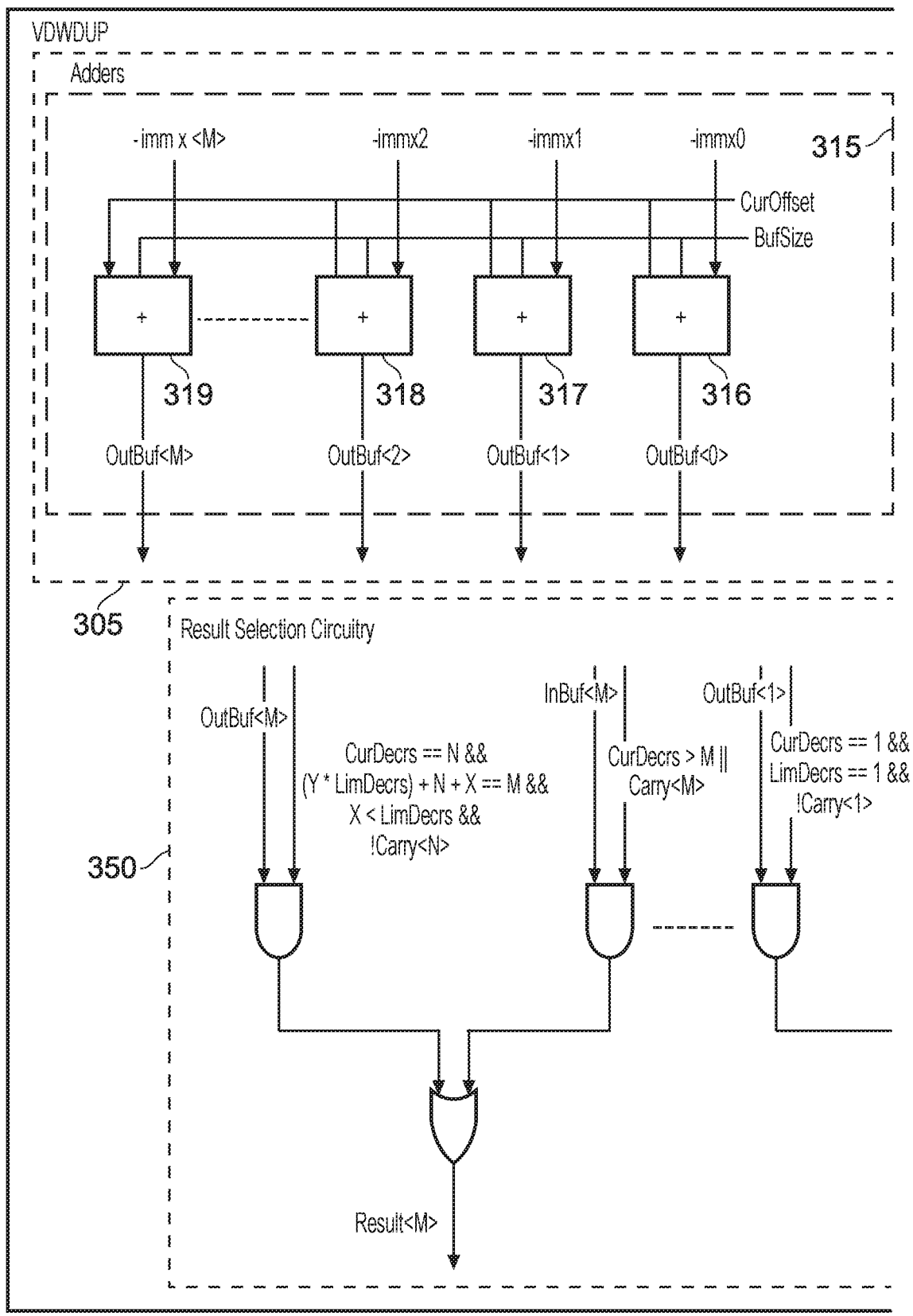
FIG. 7B illustrates in more detail components provided within the vector generating circuitry used in one example implementation to generate a vector of elements where the elements follow a regularly progressing decrementing sequence that is constrained to wrap as required by wrapping control information.
Figure 7B:
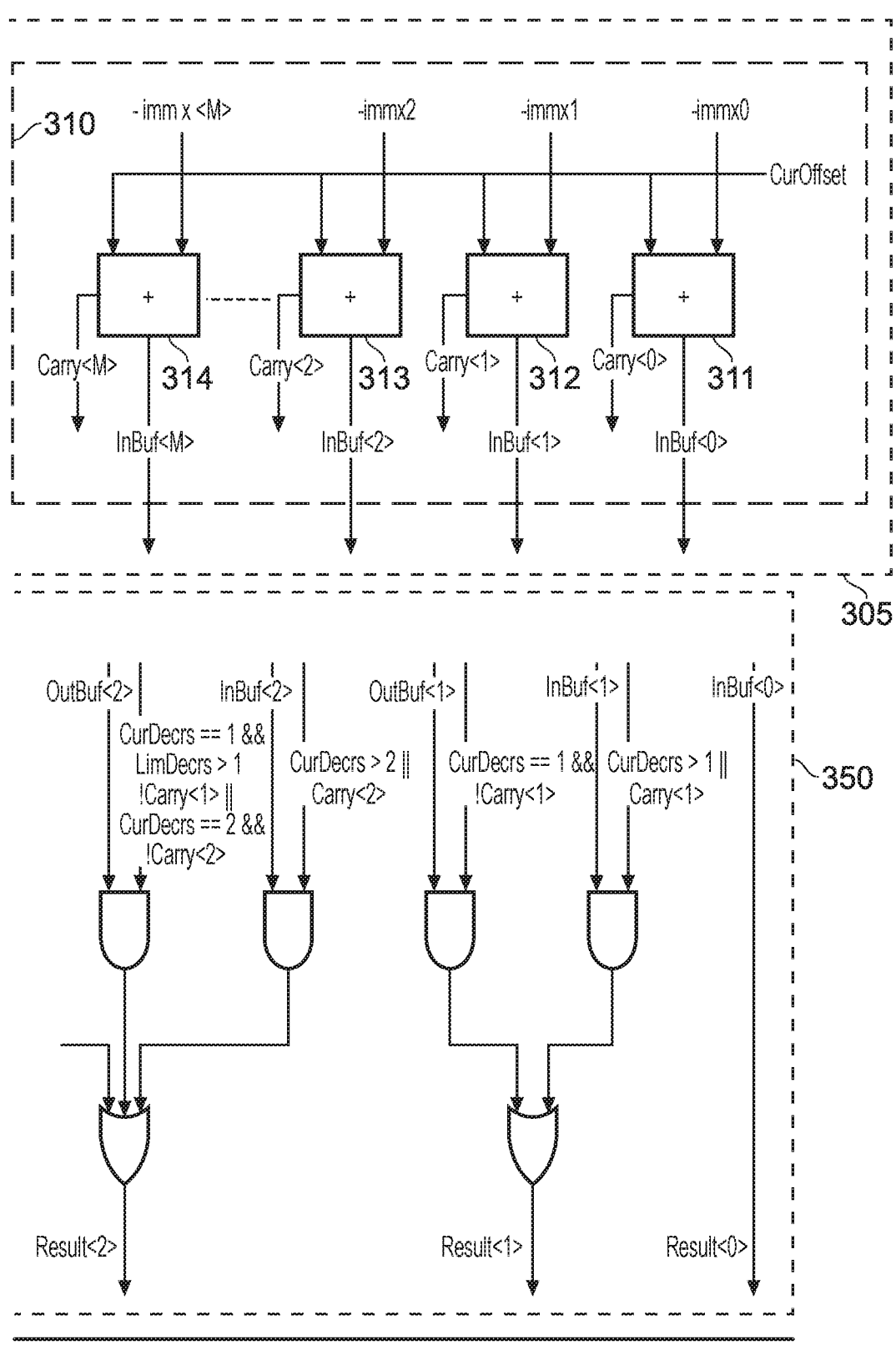
Figure 7B:
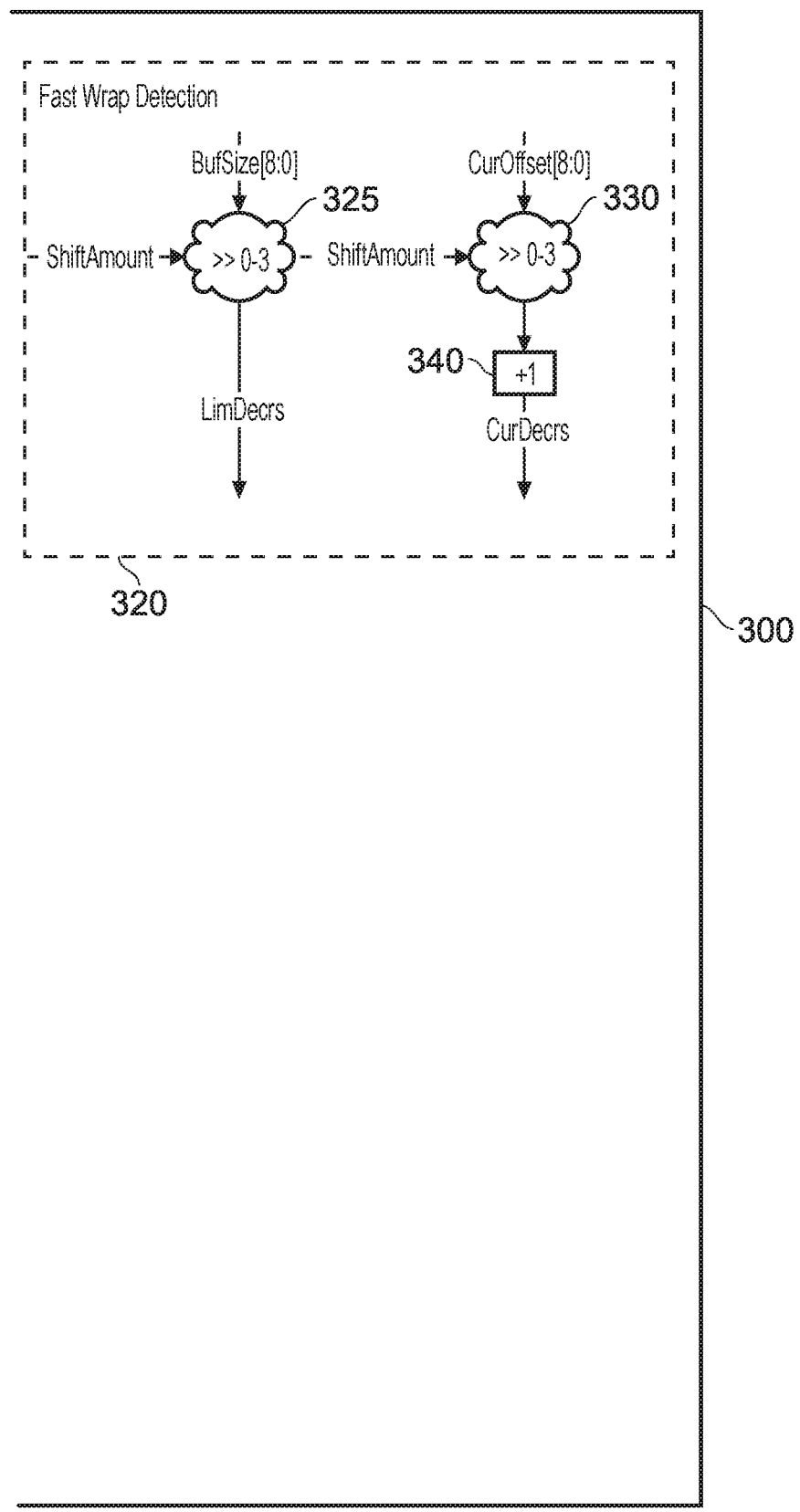

FIG. 7B illustrates a form of the vector generating circuitry that can be used when performing a decrementing version of the vector generating operation, as for example may be required when executing the VDWDUP instruction referred to earlier. As with FIG. 7A, the vector generating circuitry 300 of FIG. 7B includes adder circuits 305 that can be considered to form first adder circuitry 310 and second adder circuitry 315, fast wrap detection circuitry 320 and result selection circuitry 350. As will be apparent from a comparison of FIGS. 7A and 7B, the first adder circuits and second adder circuits perform different computations when implementing the decrementing version, as compared with the equivalent adder circuits used to implement the incrementing version. In particular, the first adder circuitry 310 includes a series of adder blocks 311, 312, 313, 314 that each subtract a corresponding multiple of the adjust amount from the current offset value, in order to produce first candidate values assuming absence of the wrapping condition. In addition, each of the adder blocks 311, 312, 313, 314 outputs carry out values that can be used by the result selection circuitry 350.

The second adder circuitry 315 includes a series of adder blocks 316, 317, 318, 319, each of which adds the current offset value to the buffer size value, and subtracts the corresponding multiple of the adjust amount, in order to generate the corresponding second candidate value that assumes presence of the wrapping condition.

The fast wrap detection circuitry 320 includes right shift logic 325, 330 that operates in the same way as the right shift logic 225 and 230 of FIG. 7A discussed earlier, performing a right shift on the chosen number of least significant bits of the buffer size and current offset value, with the amount of shifting being dependent upon the specified adjust amount. The output from the shift logic 325 provides a limit decrement value, which is the earlier-mentioned adjustment limit value in the implementation where a decrementing sequence is being generated. In the example shown in FIG. 7B, the output from the right shift logic 330 is used to form the current decrements value, i.e. the earlier-mentioned current adjustment value assuming the decrementing sequence is being generated. As shown in FIG. 7B, in this example, 1 is added to the output from the right shift logic 330 by the adder 340 in order to form the current decrement value. This is due to the fact that the lowest location/value is referred to as location/value zero, and hence the output from the right shift logic 330 needs incrementing by 1 in order to correctly identify the number of regularly progressing values that are available before the wrapping condition occurs.

Due to the way in which the adder circuitry 305 and fast wrap detection circuitry 320 differ from the adder circuitry 205 and fast wrap detection circuitry 220 of FIG. 7A, both the circuit of FIG. 7A and the circuit of FIG. 7B can use the same result selection circuitry (with only the carry out signals being inverted in the FIG. 7B example relative to the FIG. 7A example), and hence it will be appreciated that the result selection circuitry 350 is essentially the same as the result selection circuitry 250 of FIG. 7A. The result selection circuitry 350 selects the final result using the outputs from the fast wrap detection circuitry and adder circuitry as follows:

1) 'Result<M>' is set to 'InBuf<M>' if 'CurDecrs' is greater than 'M' or 'Carry<M>' is set.
2) 'Result<M>' is set to 'OutBuf<N+X>' if:
  a. 'CurDecrs' is equal to 'N'
  b. 'Carry<N>' is not set
  c. 'X' is less than 'LimIncrs'
  d. 'M' is equal to the sum of a multiple 'Y' of 'LimIncrs', 'N' and 'X'
  e. 'M', 'Y', 'X', 'N' are all positive integers Note that, case 2 is a simultaneous equation that can be satisfied by only one value of 'N', 'X', 'Y' for each element. In practice, all possible values of 'N', 'X', 'Y' are included as an input leg to the corresponding element mux but this has not been shown on the diagram for brevity.

Figure 8A:
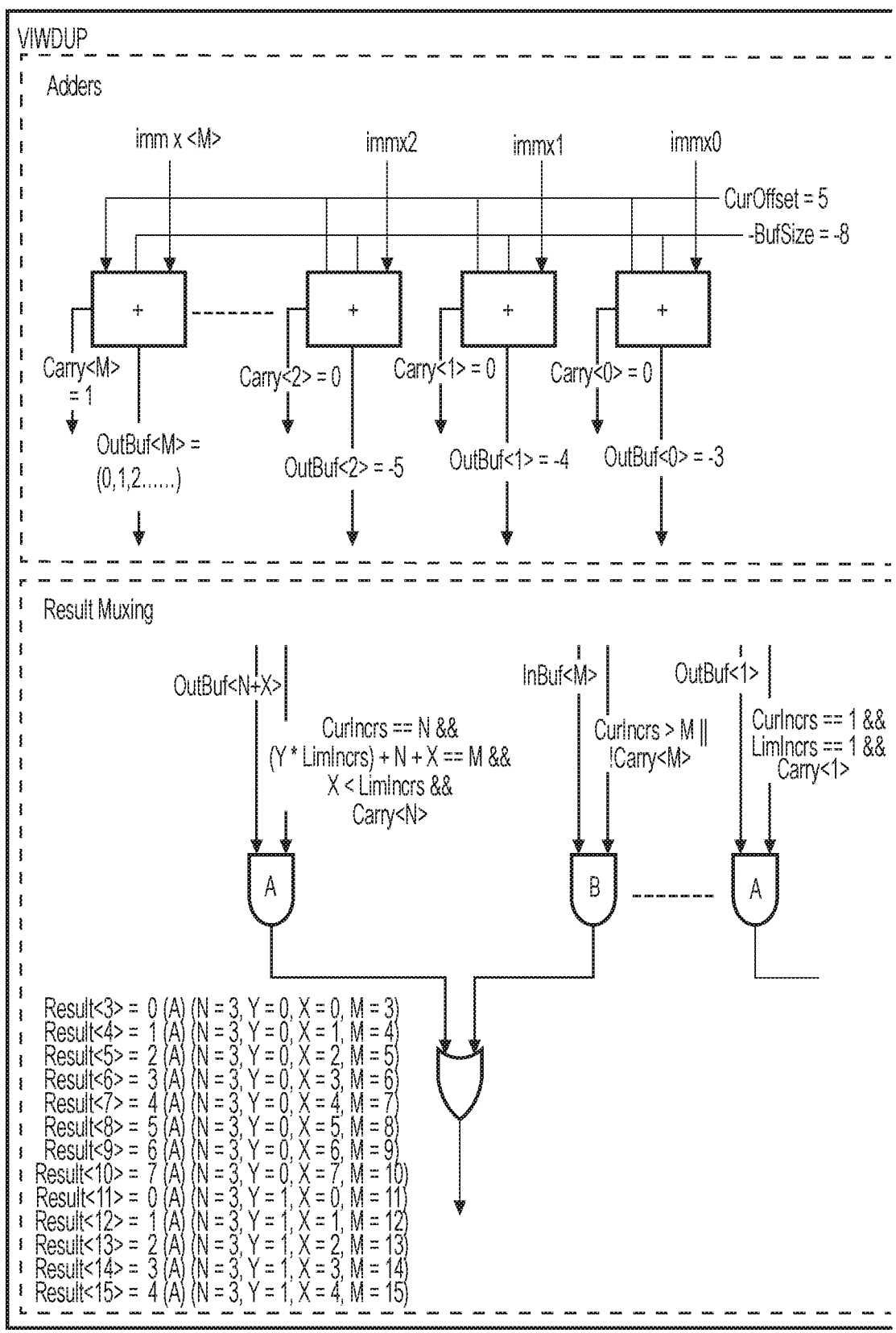
FIGS. 8A to 8F illustrate use of the circuitry of FIGS. 7A and 7B to generate vectors of elements for certain specific examples of scalar start value, adjust amount and wrapping control information.
Figure 8A:
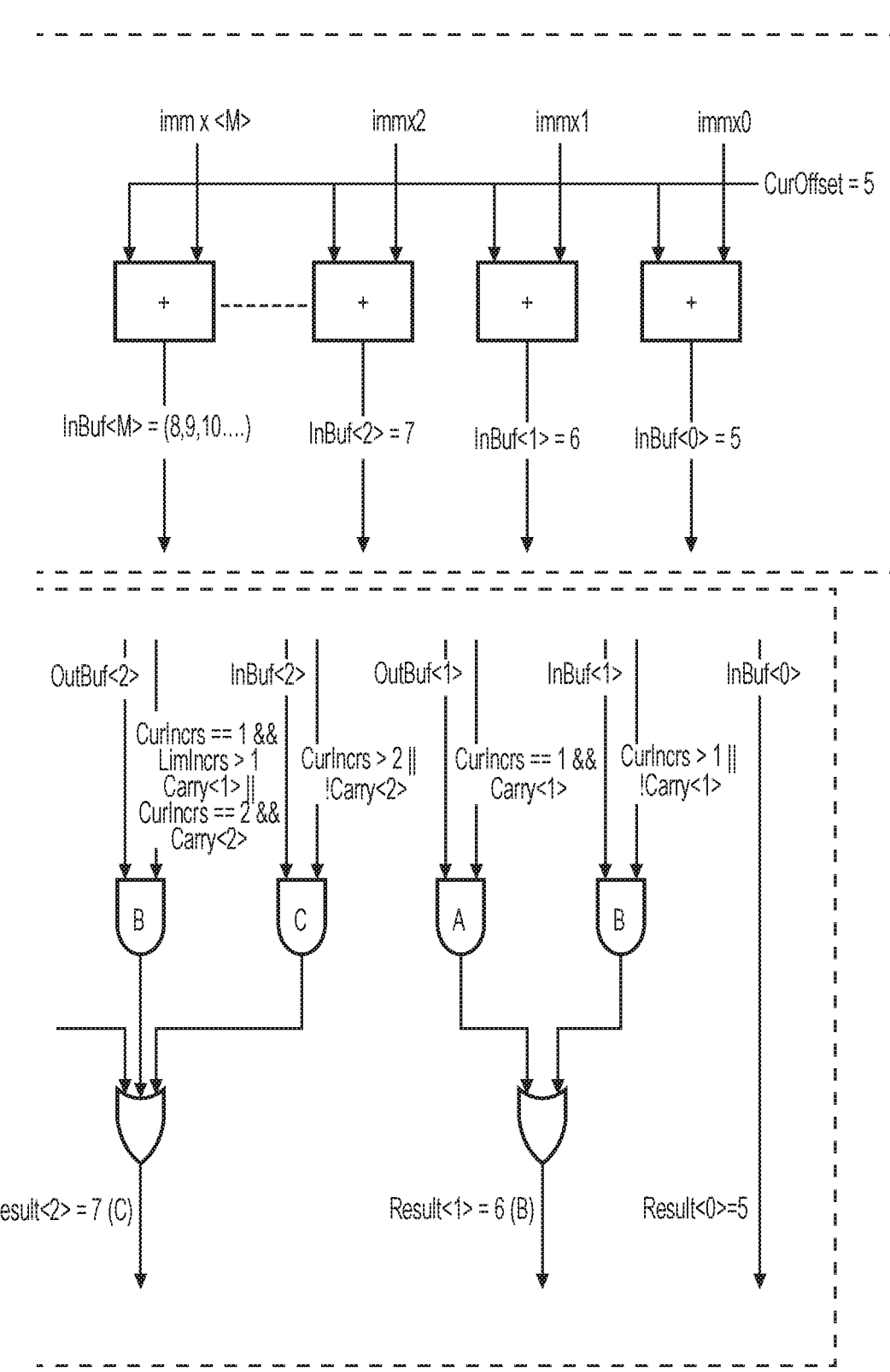
Figure 8A:
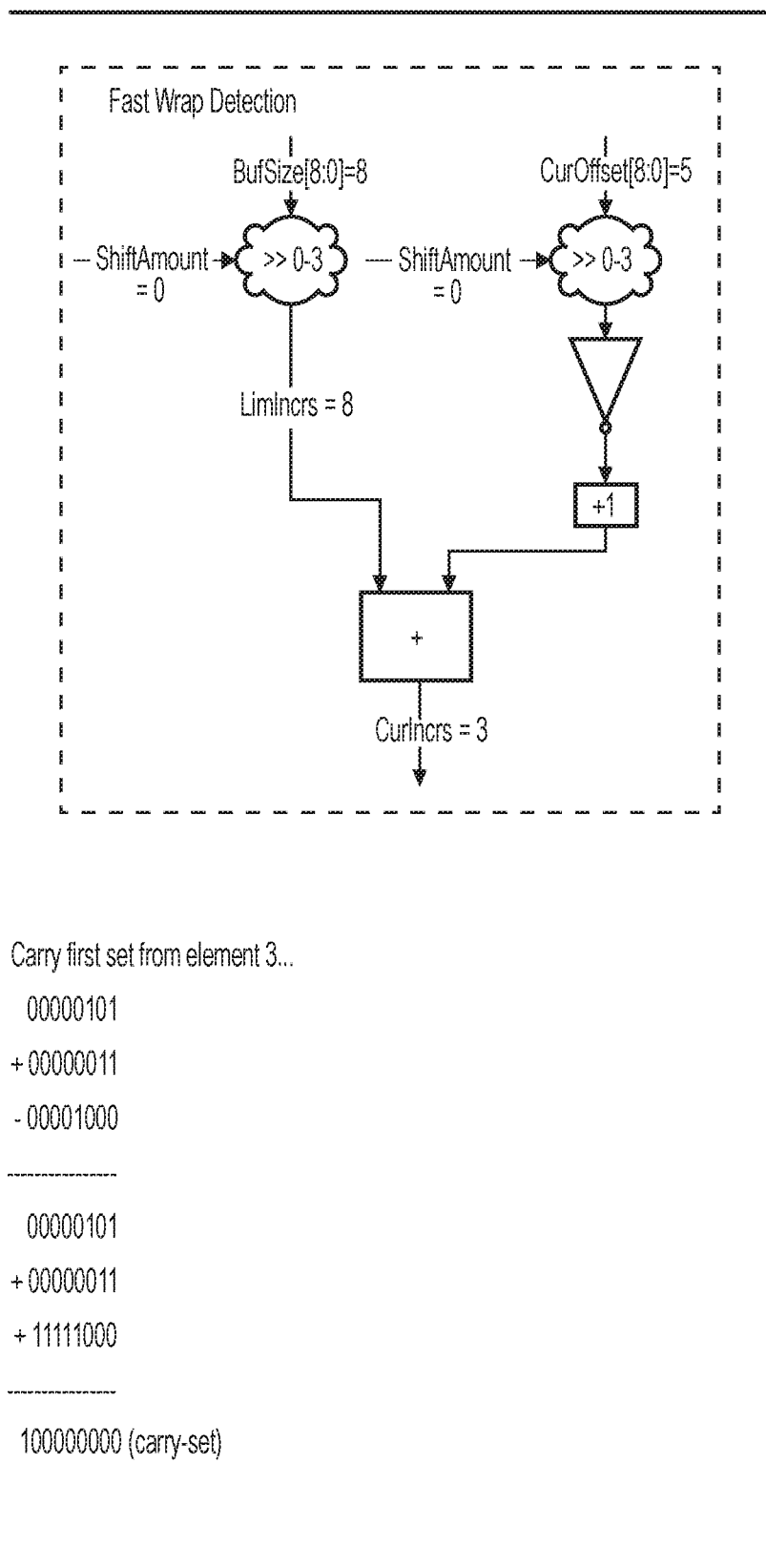
Figure 8B:
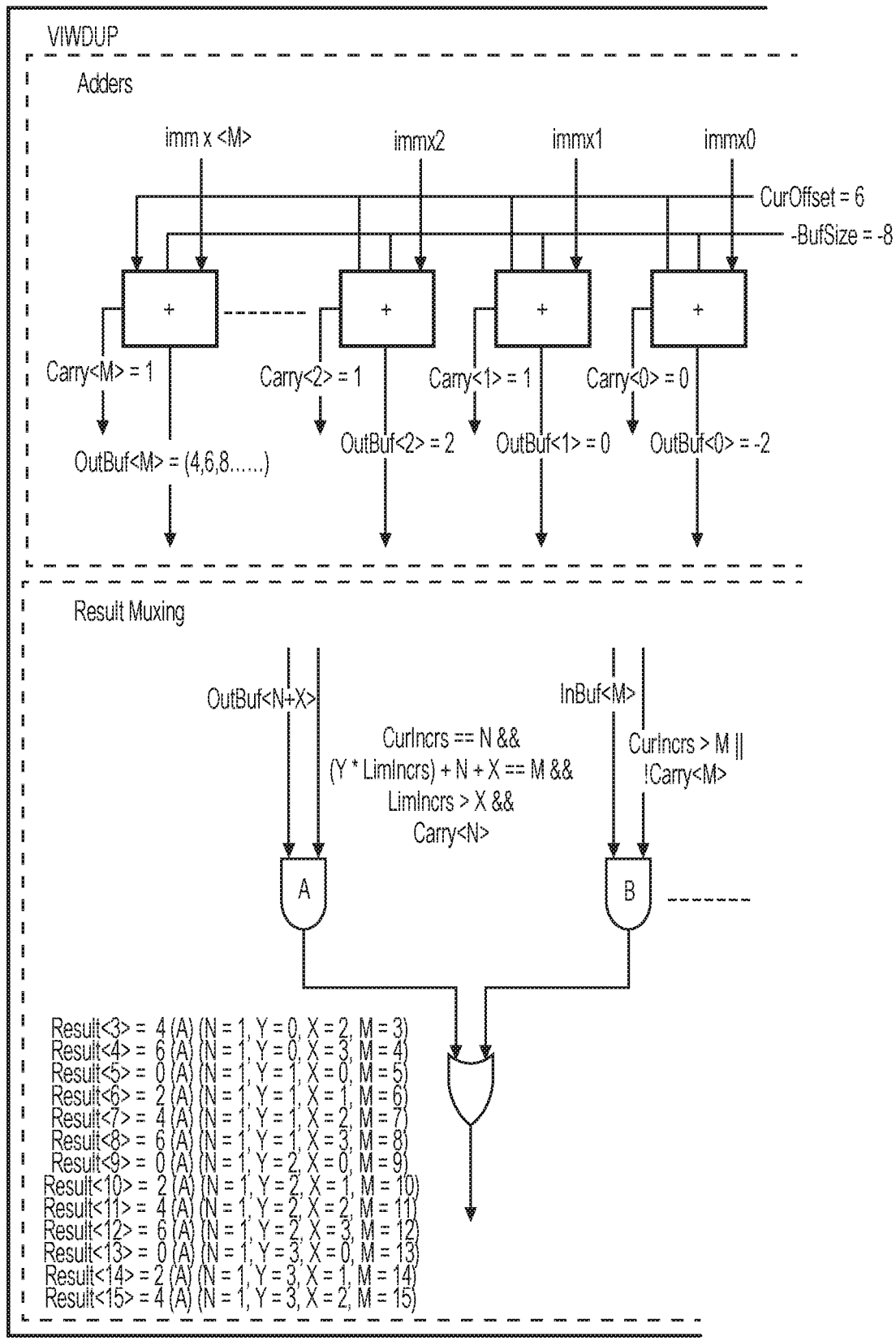
Figure 8B:
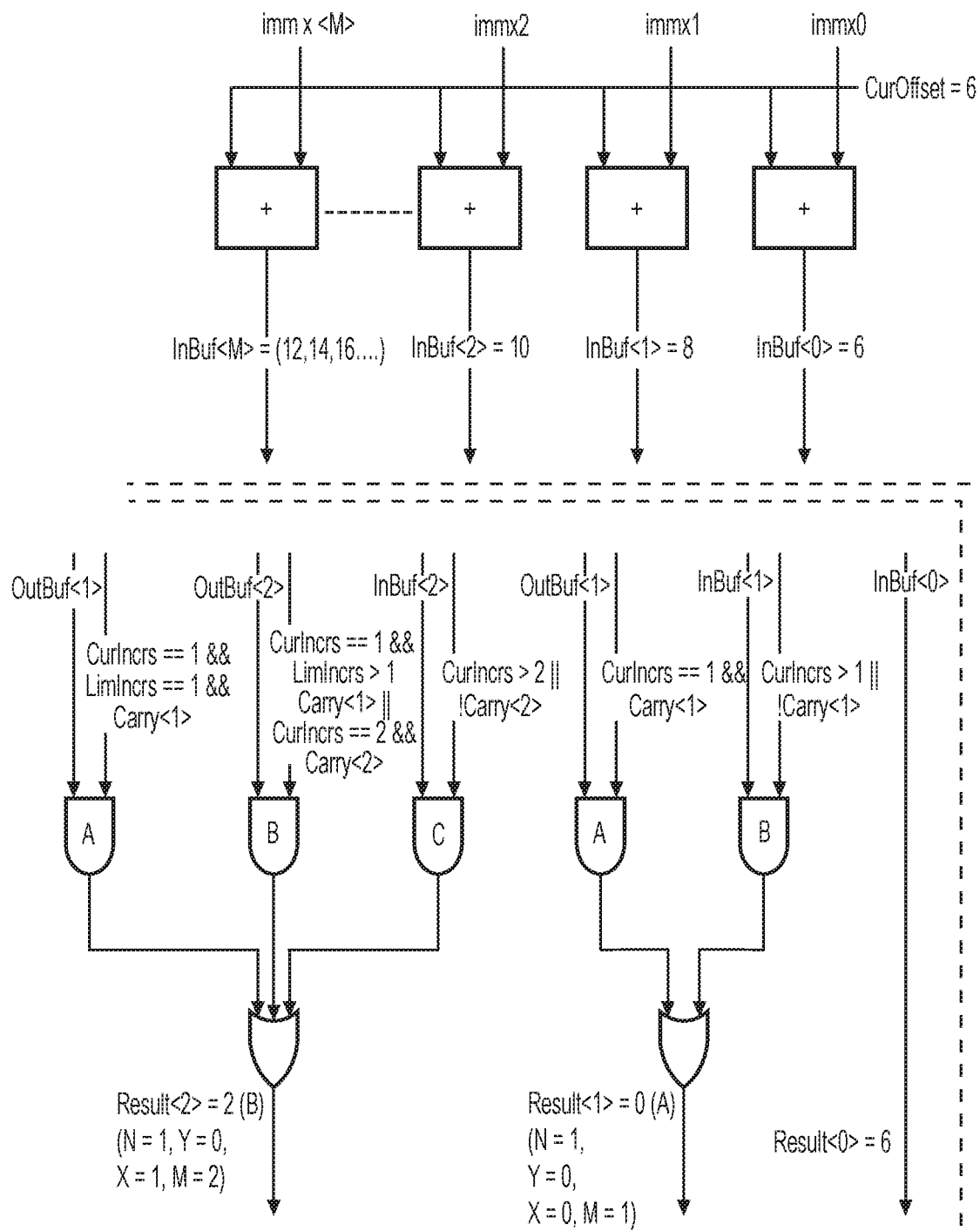
Figure 8B:
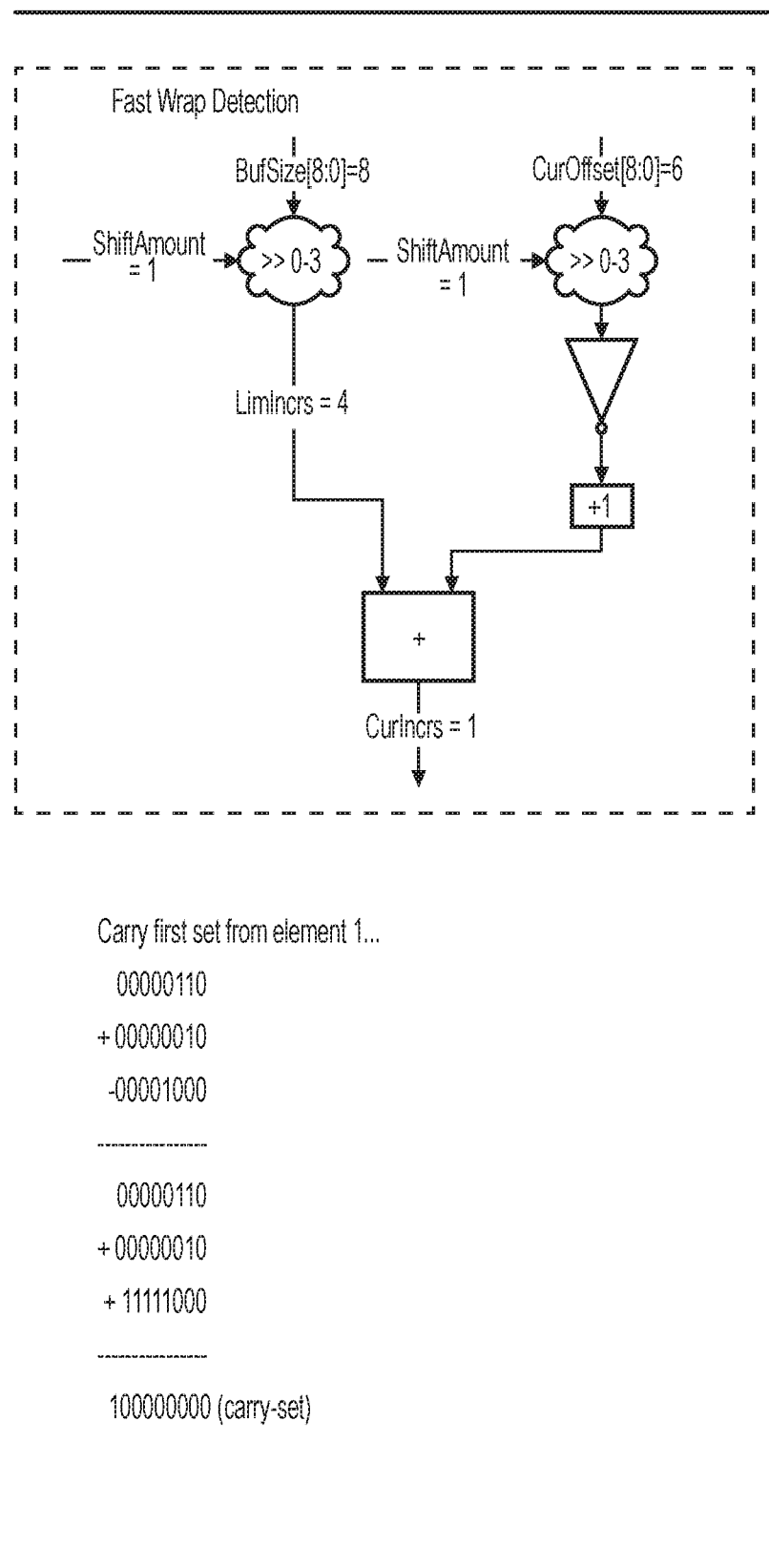
Figure 8C:
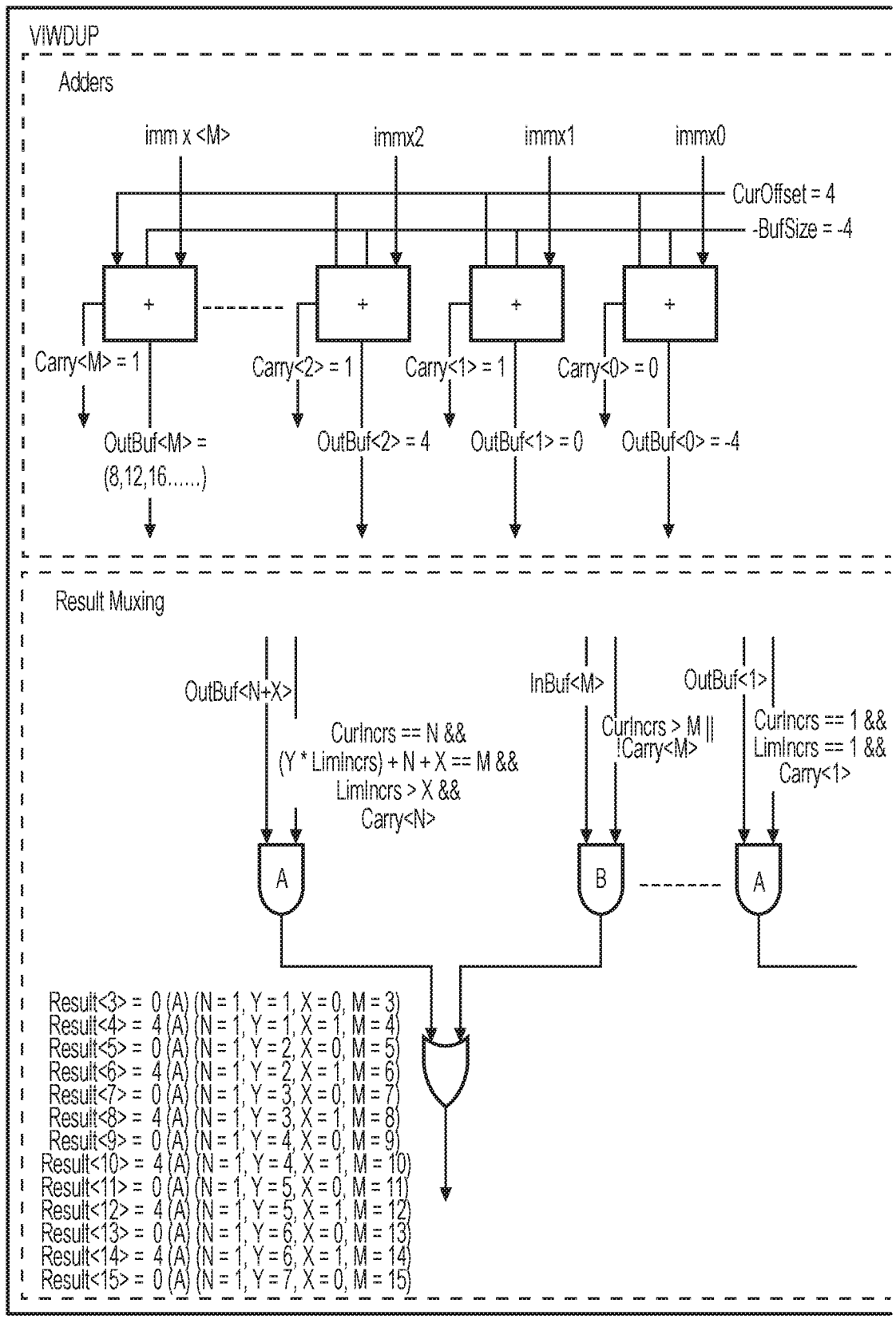
Figure 8C:
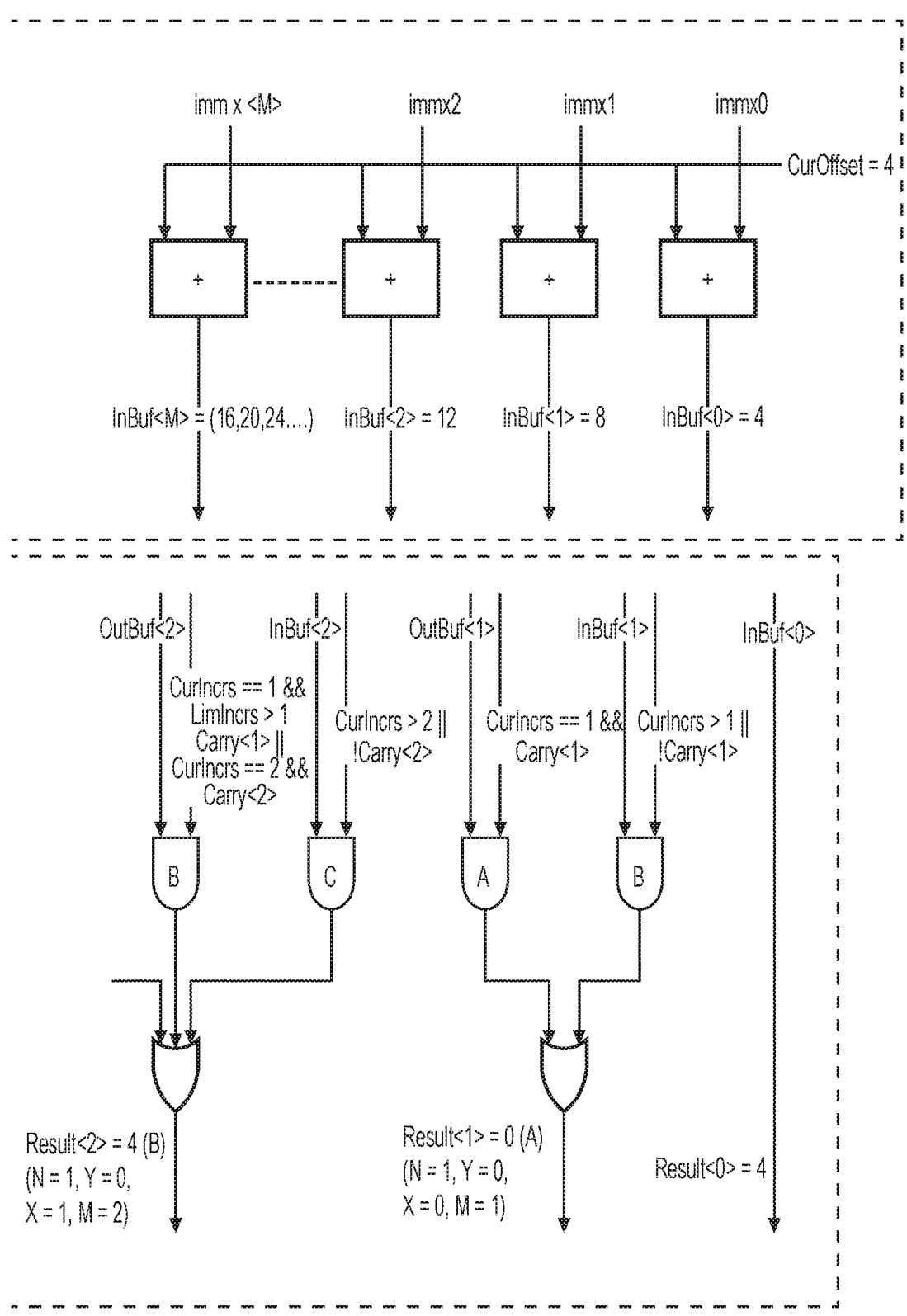
Figure 8C:
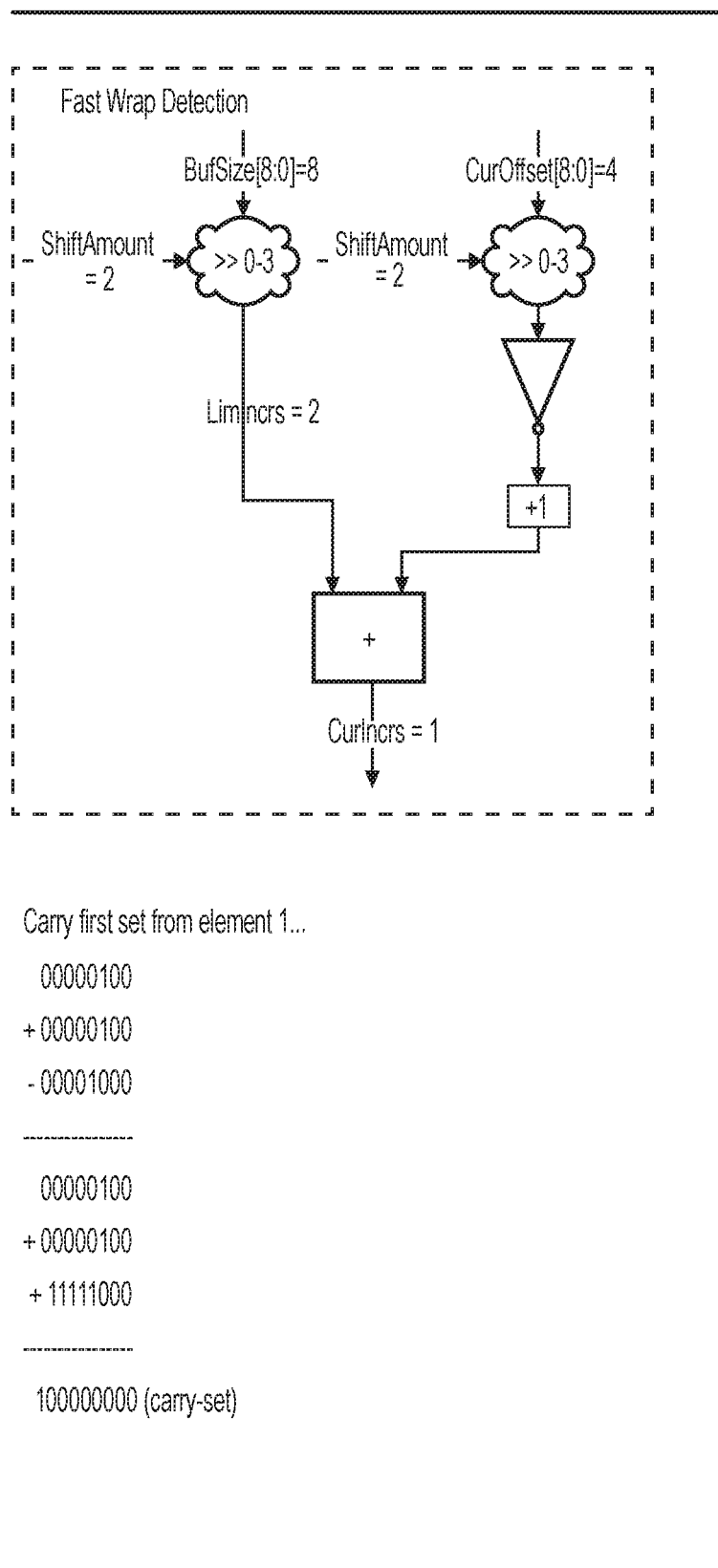
Figure 8D:
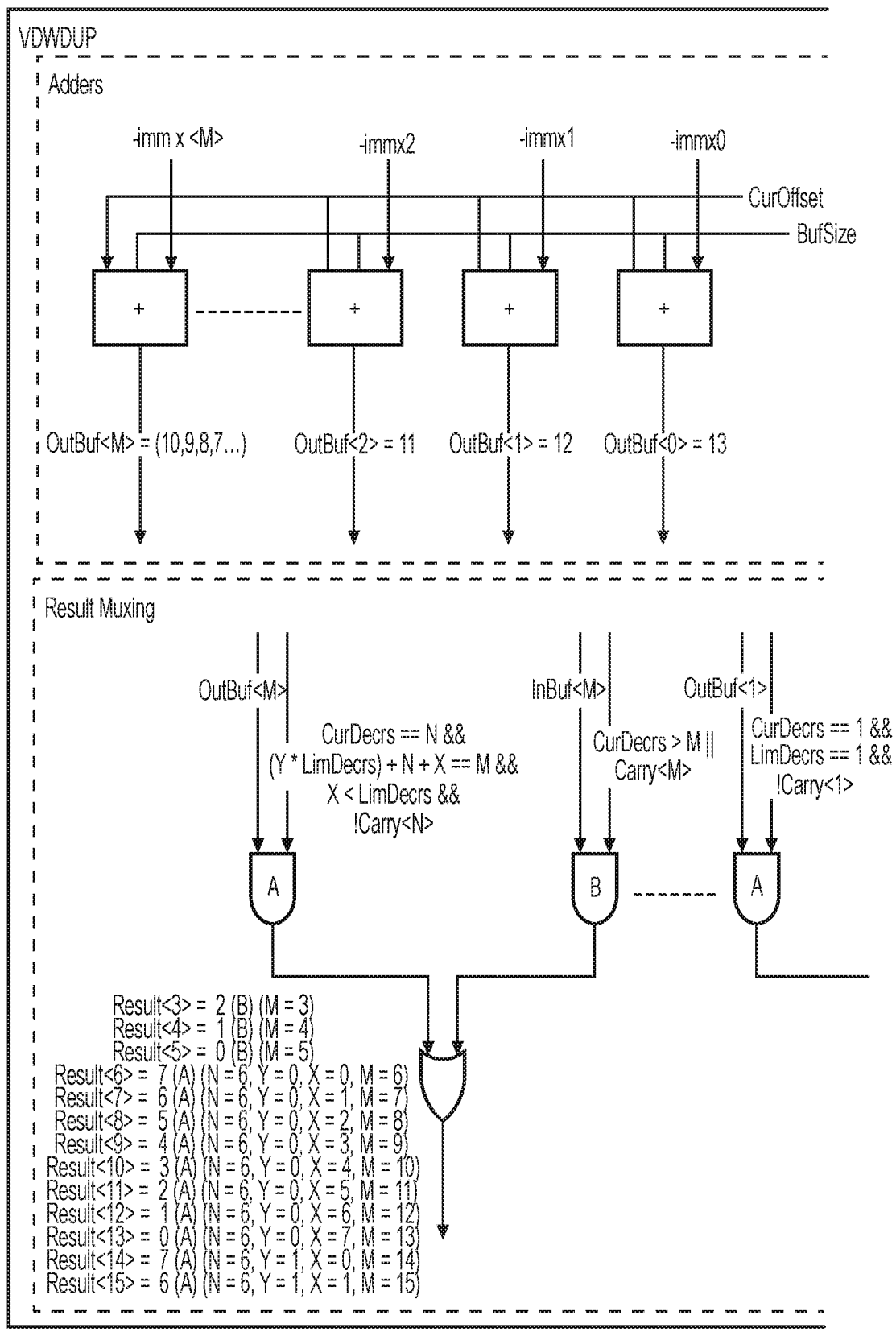
Figure 8D:
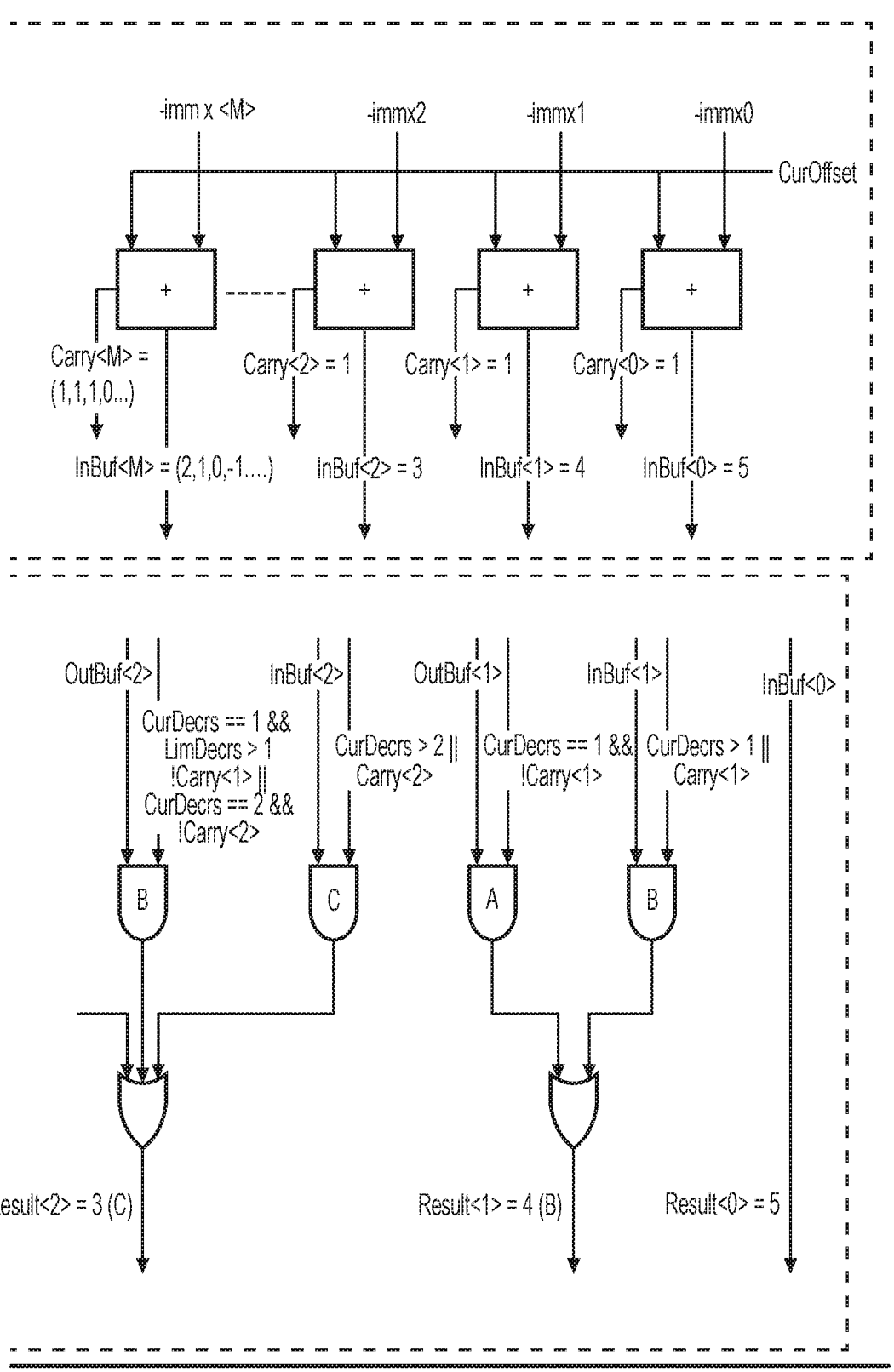
Figure 8D:
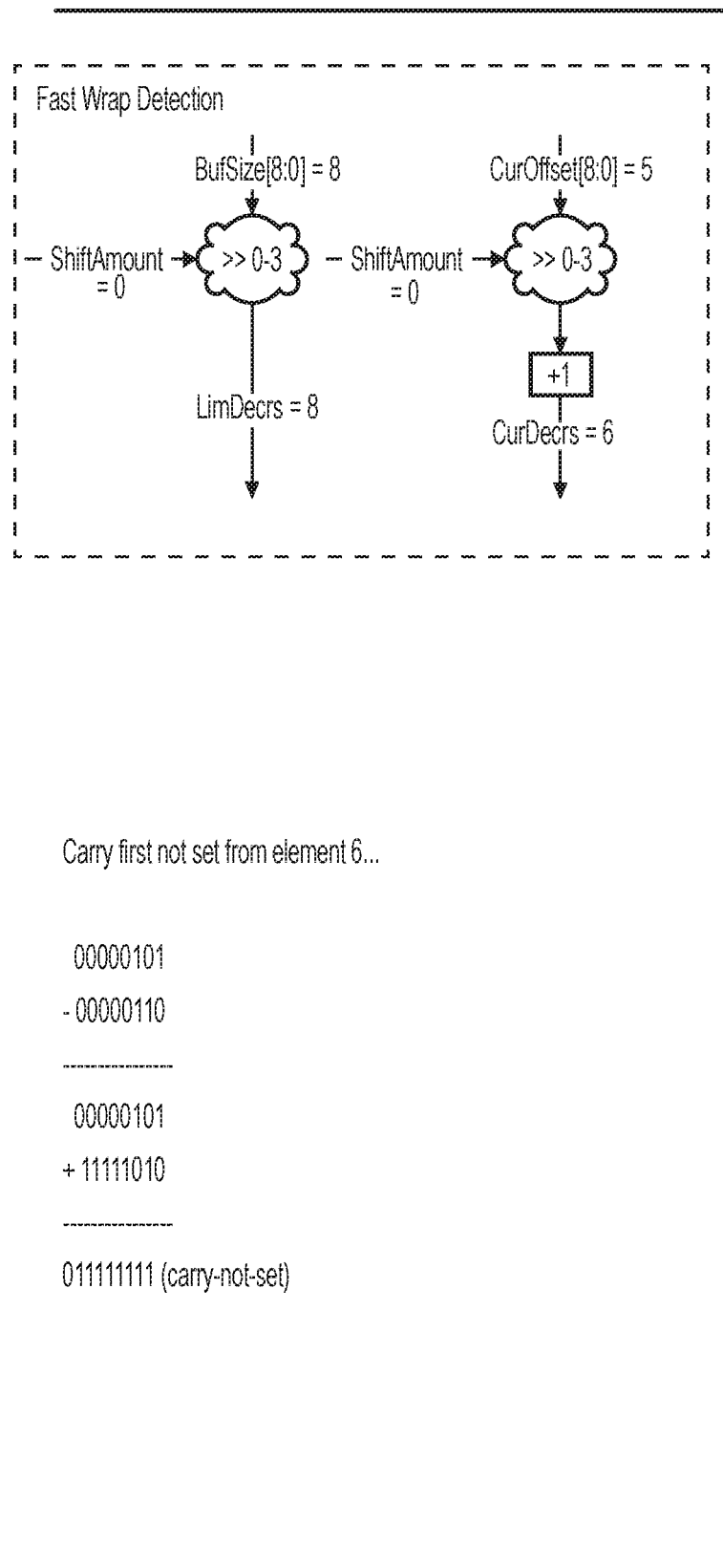
Figure 8E:
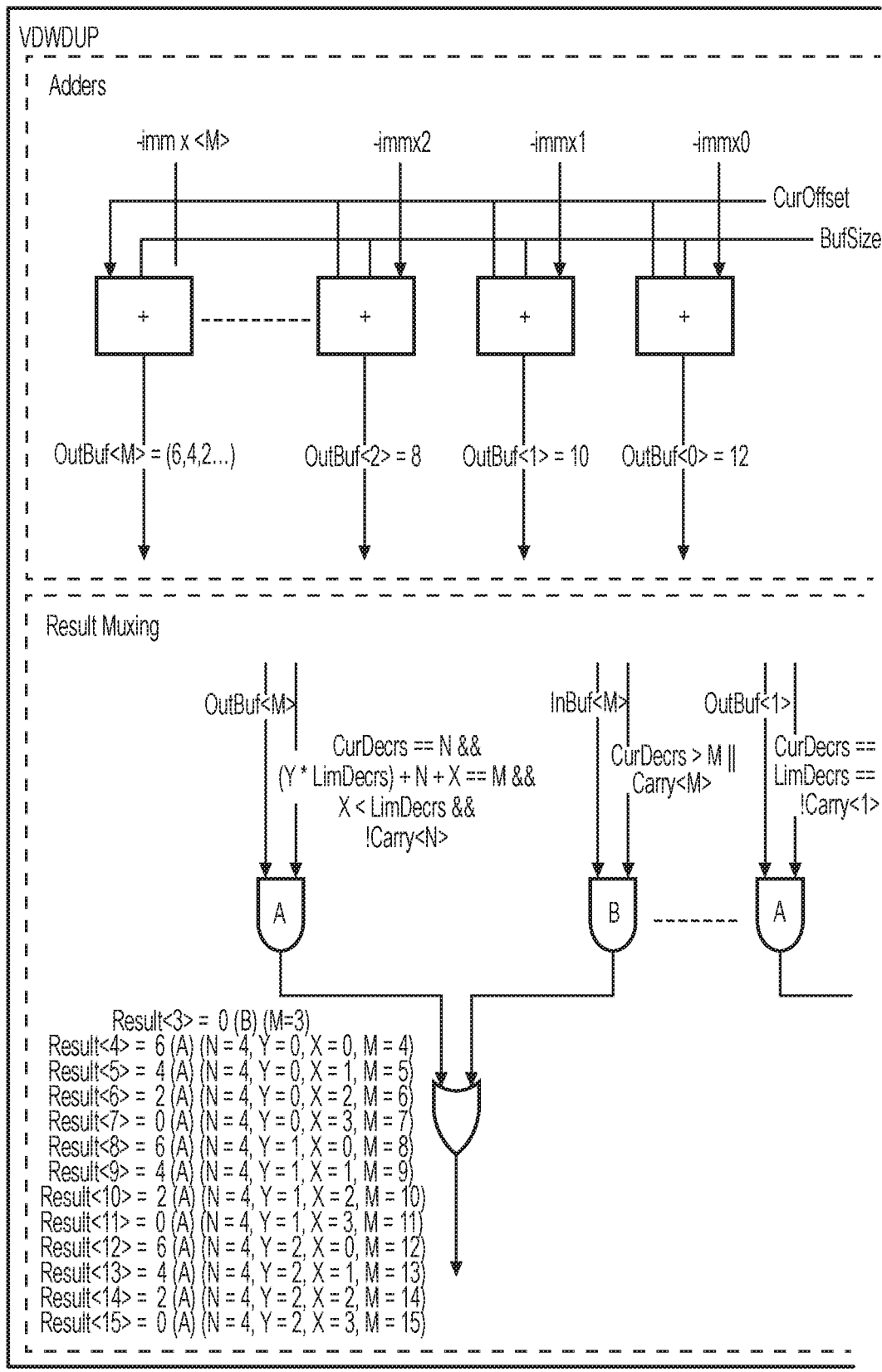
Figure 8E:
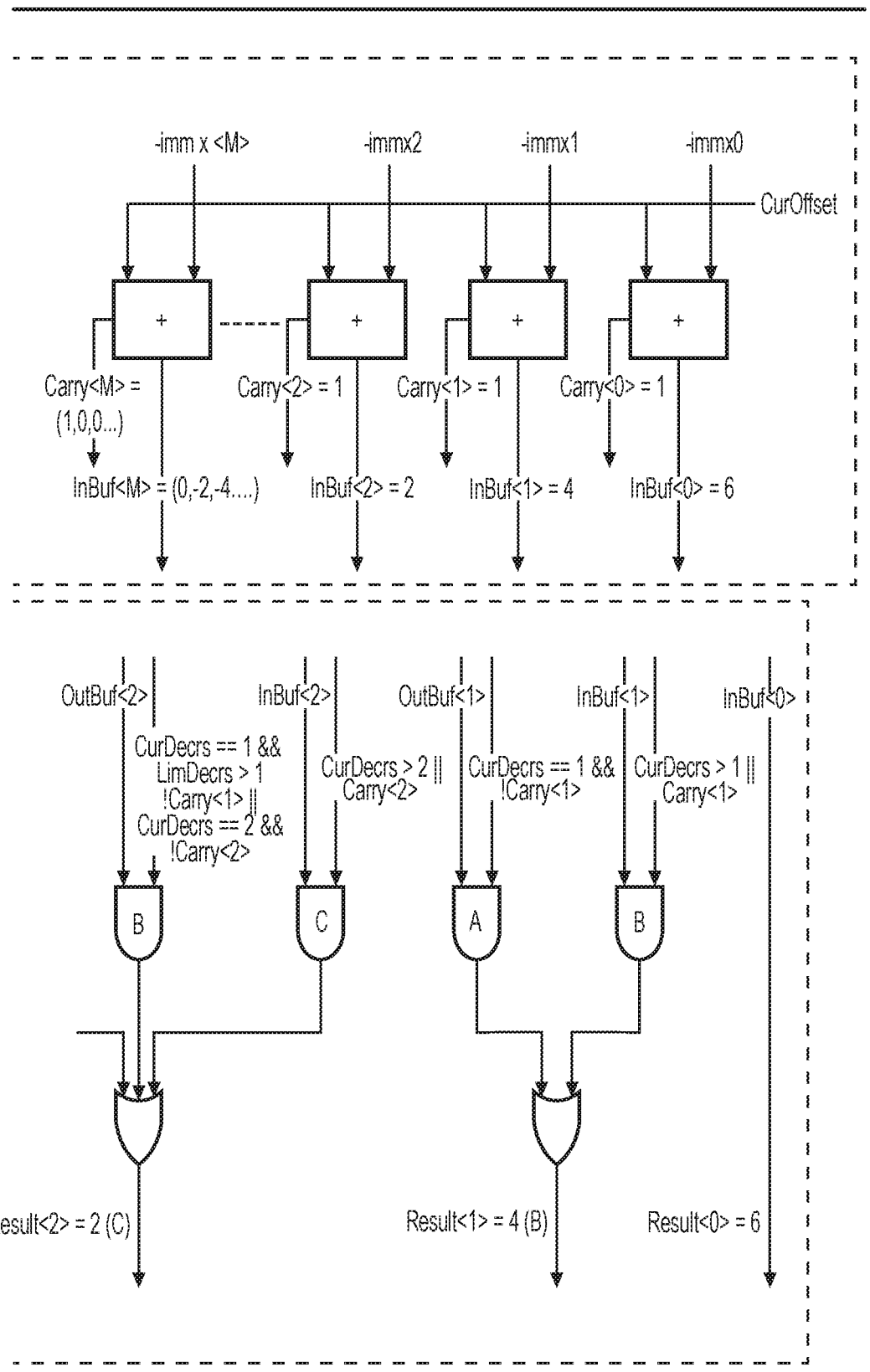
Figure 8E:
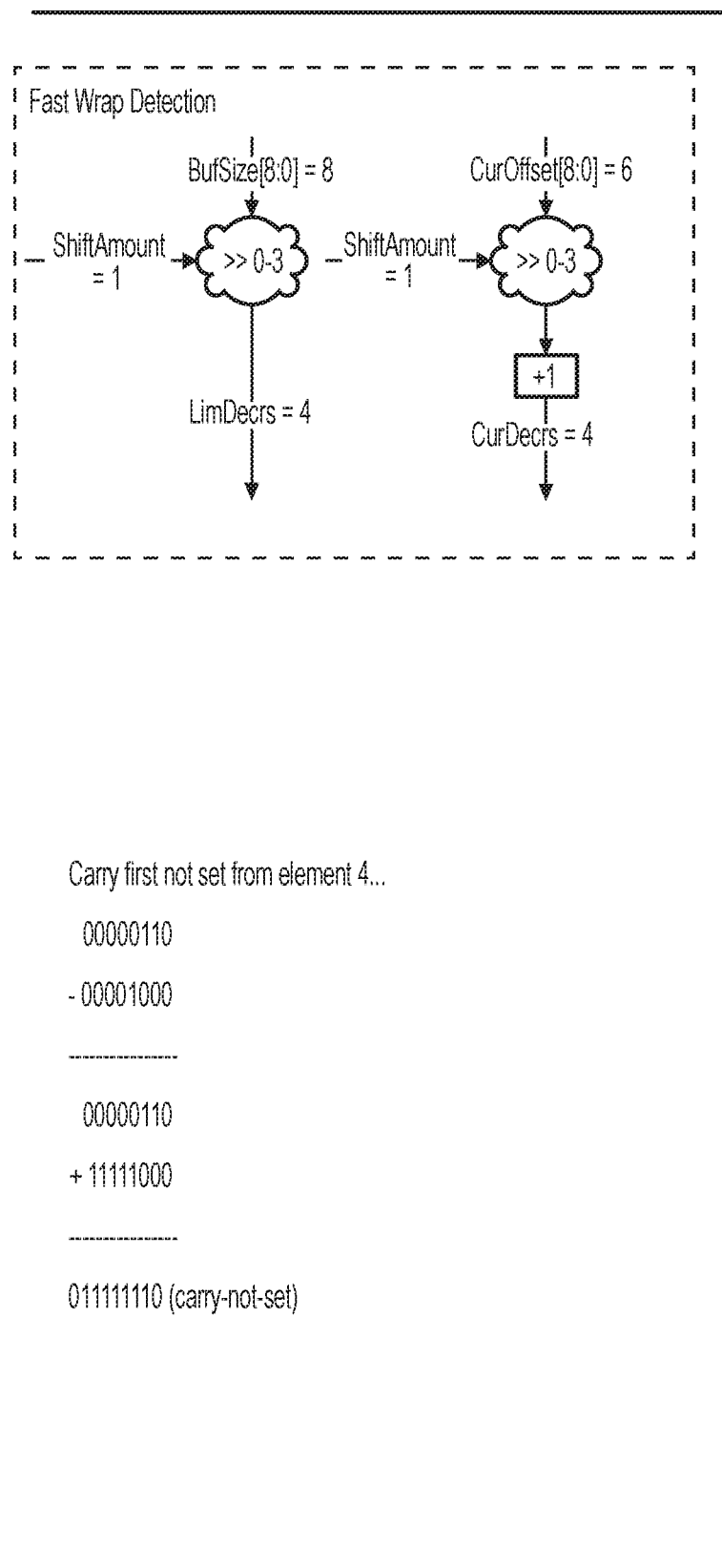
Figure 8F:
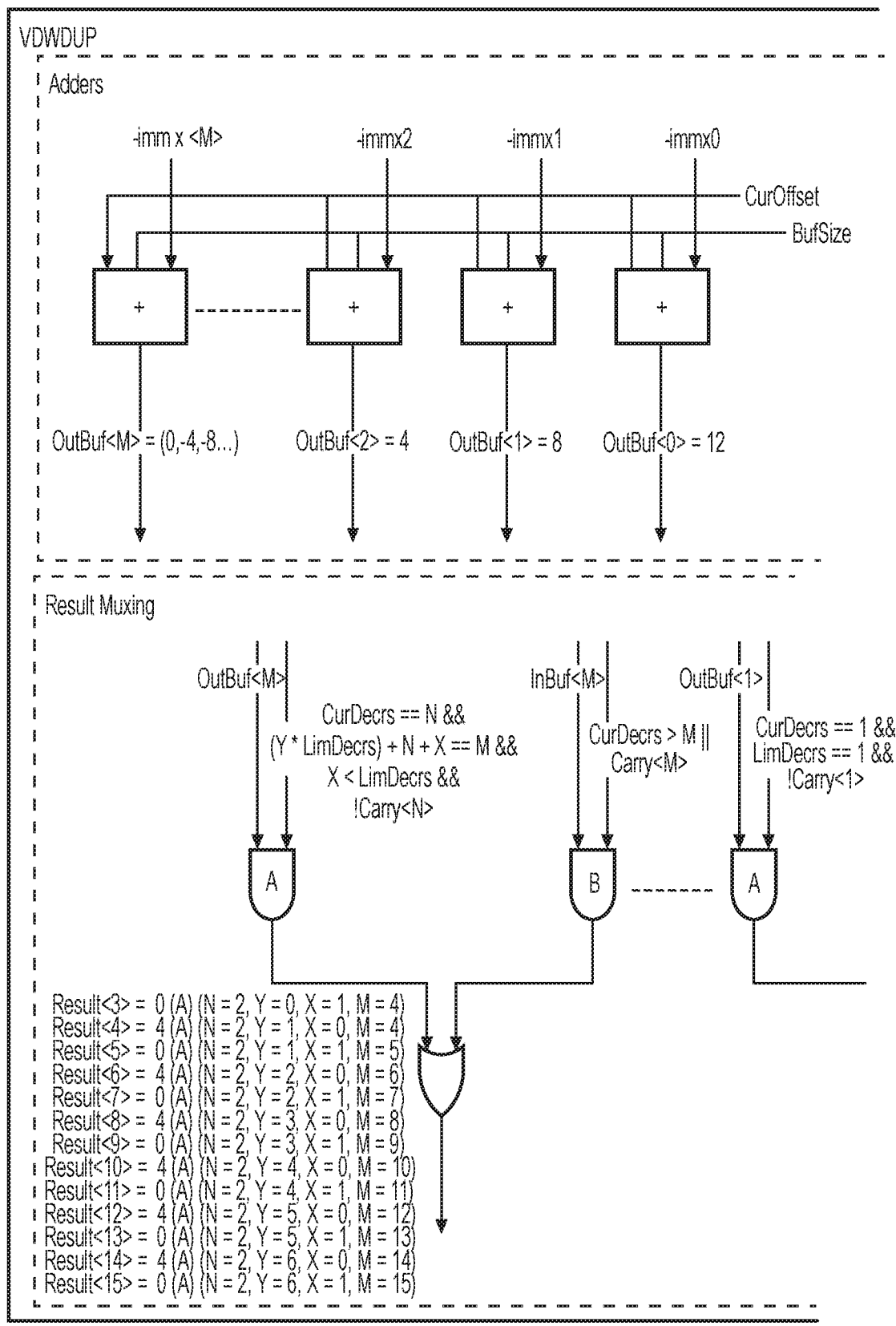
Figure 8F:
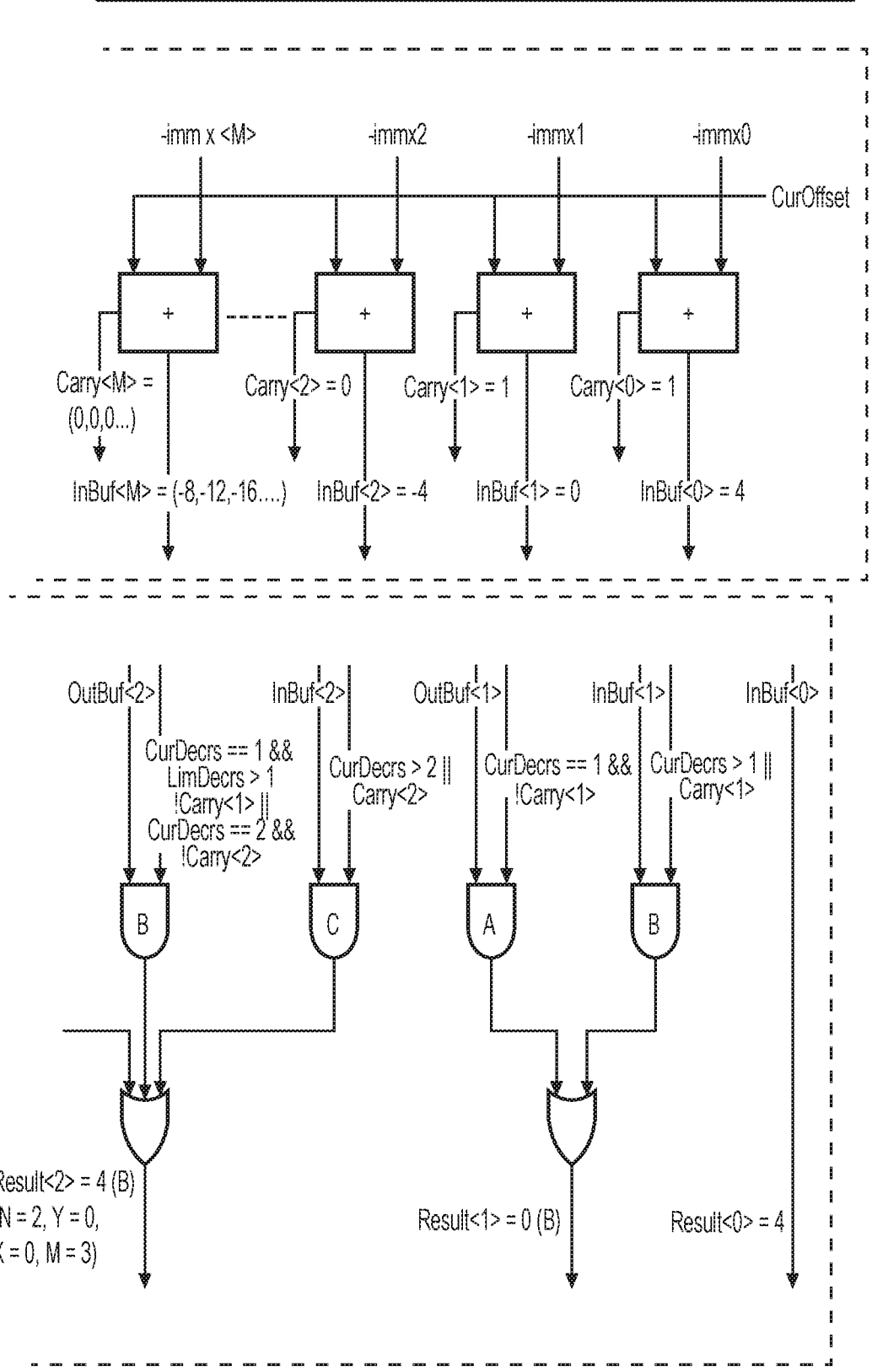
Figure 8F:
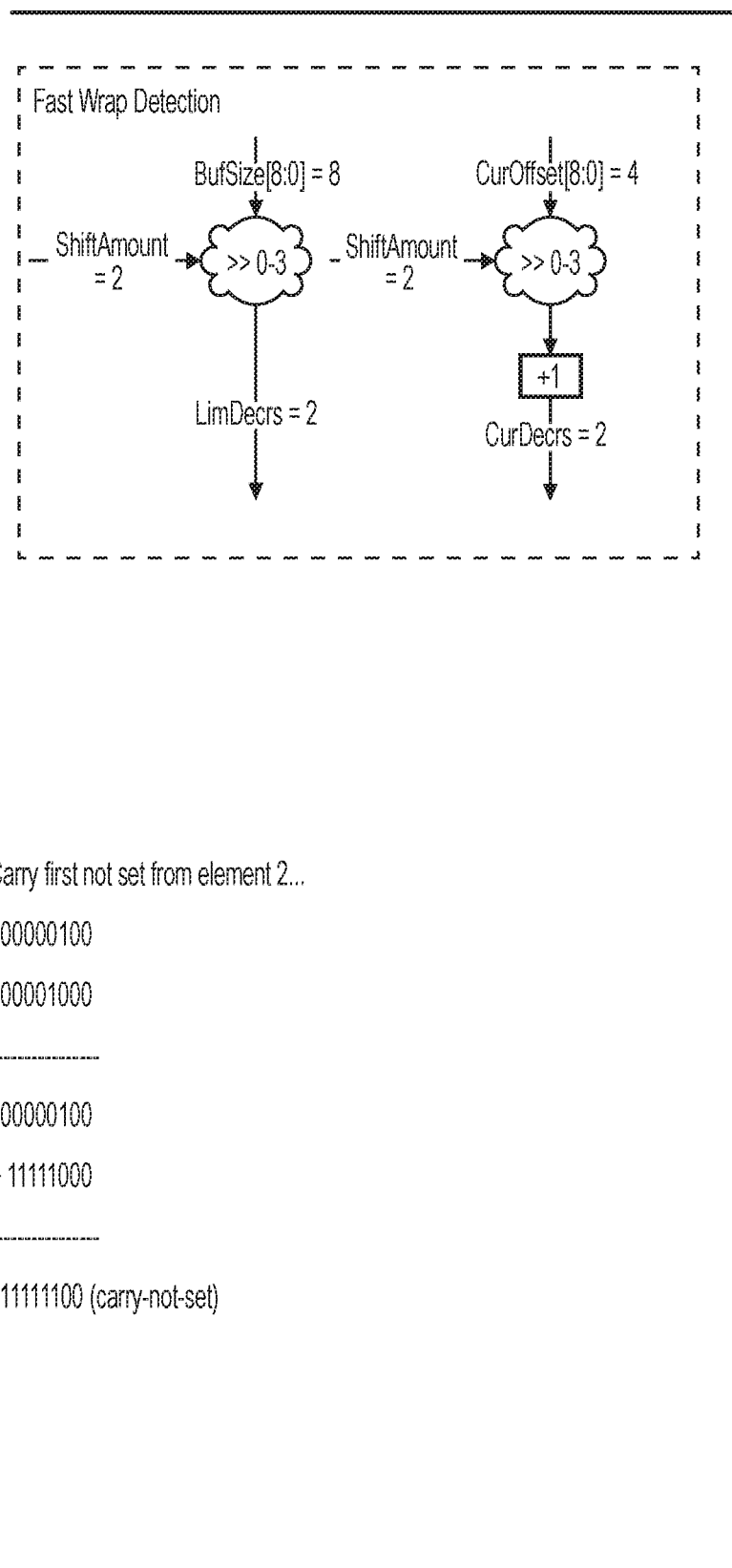

FIGS. 8A to 8C illustrate the circuitry of FIG. 7A, and show the results generated for the three examples shown in FIG. 4, respectively. As is clear from these examples, the circuitry shown in FIGS. 8A to 8C correctly outputs the required vector of elements as per the examples shown in FIG. 4. FIGS. 8D to 8F illustrate the decrementing version of the vector generating circuitry discussed earlier with reference to FIG. 7B, for the same three example input values shown in the examples of FIG. 4. Again, it can be seen that the circuitry produces the correct sequence of elements in the output vector, taking into account the required wrap points. In each of FIGS. 8A to 8F, the reference to "A", "B" or "C" is a reference to the AND gate whose output is chosen when selecting the result for the corresponding element. Further, for each element whose result is selected from the second adder circuitry rather than the first adder circuitry, the values of N, Y, X and M are shown.

When using the form of vector generating circuitry described herein, the vector generating circuitry is capable of handling cases where the buffer size is smaller than a size value determined by multiplying the number of elements in the vector by the adjust amount, and in particular is capable of handling the presence of more than one wrap point during the generation of the vector of elements. Further, by parallelising the adders, and arranging the first adder circuitry and the second adder circuitry to operate independently of each other, this can reduce the logic depth and increase the frequency with which the circuit can operate, thus serving to allow the use of the vector generating circuitry within an apparatus operating at a high clock frequency.

The improved timing can be demonstrated as follows. A known previous data path implementation of the VIWDUP or VDWDUP vector generating circuitry had the following critical path:
t-legacy=t-32bit3inputadder+t-32bit2inputadder+t-2to1mux In contrast the implementation described herein has the following critical path:
t-new=t-32bit3inputadder+t-16to1mux+t-2to1mux The time t-32bit2inputadder is greater than the time t-16to1 mux, and hence the timing is improved relative to the known design.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
an input interface to receive a scalar start value, an adjust amount and wrapping control information;
vector generating circuitry to generate a vector comprising a plurality of elements such that a value of a first element in the plurality of elements is dependent on the scalar start value, and values of the plurality of elements follow a regularly progressing sequence that is constrained to wrap as required to ensure that each value is within bounds determined from the wrapping control information, with the adjust amount being used to determine a difference between values of adjacent elements in the regularly progressing sequence;
the vector generating circuitry comprising:
first adder circuitry to generate a plurality of first candidate values for the plurality of elements, assuming absence of a wrapping condition;
second adder circuitry to generate a plurality of second candidate values for the plurality of elements, assuming presence of a wrapping condition;

wrap detection circuitry to determine an adjustment limit value that provides an indication of a total number L of regularly progressing values differing by the adjust amount that are available within the bounds determined from the wrapping control information, and a current adjustment value that, taking into account the scalar start value, provides an indication of an initial number C of regularly progressing values differing by the adjust amount that are available before the wrapping condition occurs; and result selection circuitry to receive the first candidate values and second candidate values, and to select, for each element in the plurality of elements, one of the first candidate values and the second candidate values, in dependence on at least the adjustment limit value and the current adjustment value.

2. An apparatus as claimed in claim 1, wherein:
the result selection circuitry is arranged to select, for each element within the first C elements of the plurality of elements, a corresponding first candidate value.

3. An apparatus as claimed in claim 1, wherein when the initial number C of regularly progressing values is less than a total number of elements P forming the plurality of elements, the result selection circuitry is arranged to treat each element in the plurality of elements after the first C elements as having the wrapping condition associated therewith.

4. An apparatus as claimed in claim 3, wherein:
the result selection circuitry is arranged to select, for each element after the first C elements, one of the second candidate values.

5. An apparatus as claimed in claim 4, wherein:
the result selection circuitry is arranged to determine, from the initial number C of regularly progressing values, a first wrap point indicating occurrence of the wrapping condition, to determine a periodicity of wrap points from the total number L of regularly progressing values, and to determine, for each element after the first C elements, which one of the second candidate values to select in dependence on a number of wrap points that have occurred prior to that element.

6. An apparatus as claimed in claim 5, wherein when only the first wrap point is encountered when generating the values for the P elements, the result selection circuitry is arranged to select, for each element after the first C elements of the plurality of elements, a corresponding second candidate value.

7. An apparatus as claimed in claim 5, wherein when multiple wrap points are encountered when generating the values for the P elements, the result selection circuitry is arranged to take into account the periodicity of wrap points when determining, for each element after the first C elements of the plurality of elements, which second candidate value to select for that element.

8. An apparatus as claimed in claim 1, wherein:
the wrap detection circuitry is arranged to determine the adjustment limit value and the current adjustment value using a determined number of least significant bits of the wrapping control information and the scalar start value.

9. An apparatus as claimed in claim 1, wherein the wrapping control information is used to determine a first bound, and a second bound is predetermined.

10. An apparatus as claimed in claim 8, wherein the wrap detection circuitry is arranged:
to apply a right shift to the determined number of least significant bits of the wrapping control information and the scalar start value, in order to generate first and second intermediate values, respectively, where an amount of the right shift is dependent on the adjust amount; and
to then determine the adjustment limit value and the current adjustment value from the first and second intermediate values.

11. An apparatus as claimed in claim 10, wherein the wrap detection circuitry is arranged to output, as the adjustment limit value, the first intermediate value formed by applying the right shift to the determined number of least significant bits of the wrapping control information.

12. An apparatus as claimed in claim 10, wherein:
when the regularly progressing sequence is an incrementing sequence, the wrap detection circuitry is arranged to generate the current adjustment value by subtracting, from the first intermediate value, the second intermediate value formed by applying the right shift to the determined number of least significant bits of the scalar start value; and
when the regularly progressing sequence is a decrementing sequence, the wrap detection circuitry is arranged to determine the current adjustment value directly from the second intermediate value.

13. An apparatus as claimed in claim 1, wherein the first adder circuitry and second adder circuitry are arranged to operate in parallel.

14. An apparatus as claimed in claim 1, wherein:
each of the first adder circuitry and second adder circuitry are arranged to logically provide separate adder blocks for each candidate value produced;
the adder blocks in one of the first adder circuitry and the second adder circuitry are arranged to generate carry out values; and
the result selection circuitry is arranged to additionally use the carry out values when selecting, for each element in the plurality of elements, one of the first candidate values and the second candidate values.

15. An apparatus as claimed in claim 14, wherein the result selection circuitry is arranged to use the carry out values in combination with the current adjustment value to determine, in instances where the wrapping condition occurs, a first wrap point that indicates occurrence of the wrapping condition.

16. An apparatus as claimed in claim 14, wherein the result selection circuitry is arranged to use the carry out values, in combination with the current adjustment value and the adjustment limit value, when determining, for each element after the first C elements, which one of the second candidate values to select.

17. An apparatus as claimed in claim 1, wherein:
a buffer size is determined from the wrapping control information;
the regularly progressing sequence is an incrementing sequence;
the first adder circuitry is arranged to produce each first candidate value by adding the scalar start value to a multiple of the adjust amount, where the multiple is different for each first candidate value; and
the second adder circuitry is arranged to produce each second candidate value by subtracting the buffer size from the scalar start value and adding a multiple of the adjust amount, where the multiple is different for each second candidate value, the second adder circuitry also being arranged to generate a carry out value for each second candidate value.

18. An apparatus as claimed in claim 17, wherein:
the result selection circuitry is arranged to select the value for element M to be a candidate value M amongst the first candidate values when the current adjustment value is greater than M or the carry out value is not set for a second candidate value M; and
the result selection circuitry is otherwise arranged to select the value for element M to be a candidate value N+X amongst the second candidate values, where N and X are determined by the following criteria:
a the current adjustment value is equal to N
b the carry out value for a second candidate value N is set
c X is less than the adjustment limit value
d M is equal to the sum of a multiple Y of the adjustment limit value, N and X
e M, Y, X, N are all positive integers
where the criteria a to e are only satisfied by one value of N, X and Y for each element.

19. An apparatus as claimed in claim 1, wherein:
a buffer size is determined from the wrapping control information;
the regularly progressing sequence is a decrementing sequence:
the first adder circuitry is arranged to produce each first candidate value by subtracting from the scalar start value a multiple of the adjust amount, where the multiple is different for each first candidate value, the first adder circuitry also being arranged to generate a carry out value for each first candidate value; and
the second adder circuitry is arranged to produce each second candidate value by adding the buffer size to the scalar start value and subtracting a multiple of the adjust amount, where the multiple is different for each second candidate value.

20. An apparatus as claimed in claim 19, wherein:
the result selection circuitry is arranged to select the value for element M to be a candidate value M amongst the first candidate values when the current adjustment value is greater than M or the carry out value is set for the candidate value M amongst the first candidate values;
the result selection circuitry is otherwise arranged to select the value for element M to be a candidate value N+X amongst the second candidate values, where N and X are determined by the following criteria:
a the current adjustment value is equal to N
b the carry out value for a candidate value N amongst the first candidate values is not set
c X is less than the adjustment limit value
d M is equal to the sum of a multiple Y of the adjustment limit value, N and X
e M, Y, X, N are all positive integers
where the criteria a to e are only satisfied by one value of N, X and Y for each element.

21. An apparatus as claimed in claim 1, wherein the vector generating circuitry is constrained when generating the vector such that:
a buffer size determined from the wrapping control information is a multiple of the adjust amount; and
the scalar start value is a multiple of the adjust amount.

22. A method of generating a vector of elements, comprising:
receiving a scalar start value, an adjust amount and wrapping control information; and
generating a vector comprising a plurality of elements such that a value of a first element in the plurality of elements is dependent on the scalar start value, and values of the plurality of elements follow a regularly progressing sequence that is constrained to wrap as required to ensure that each value is within bounds determined from the wrapping control information, with the adjust amount being used to determine a difference between values of adjacent elements in the regularly progressing sequence;
wherein the generating step is performed by:
employing first adder circuitry to generate a plurality of first candidate values for the plurality of elements, assuming absence of a wrapping condition;
employing second adder circuitry to generate a plurality of second candidate values for the plurality of elements, assuming presence of a wrapping condition;
determining an adjustment limit value that provides an indication of a total number L of regularly progressing values differing by the adjust amount that are available within the bounds determined from the wrapping control information;
determining a current adjustment value that, taking into account the scalar start value, provides an indication of an initial number C of regularly progressing values differing by the adjust amount that are available before the wrapping condition occurs; and
selecting, for each element in the plurality of elements, one of the first candidate values and the second candidate values, in dependence on at least the adjustment limit value and the current adjustment value.

\* \* \* \* \*